US012587698B2

(12) United States Patent
Reznik et al.

(10) Patent No.: US 12,587,698 B2
(45) Date of Patent: Mar. 24, 2026

(54) OPTIMIZATION OF ENCODING PROFILES FOR MEDIA STREAMING

(71) Applicant: ADEIA MEDIA HOLDINGS LLC, San Jose, CA (US)

(72) Inventors: Yuriy Reznik, Seattle, WA (US); Karl Lillevold, Seattle, WA (US); Abhijith Jagannath, Seattle, WA (US); Justin Greer, Waunakee, WI (US); Manish Rao, Tempe, AZ (US)

(73) Assignee: Adeia Media Holdings LLC, San Jose, CA (US)

( * ) Notice: Subject to any disclaimer, the term of this patent is extended or adjusted under 35 U.S.C. 154(b) by 2 days.

(21) Appl. No.: 18/617,332

(22) Filed: Mar. 26, 2024

(65) Prior Publication Data

US 2024/0422376 A1 Dec. 19, 2024

Related U.S. Application Data

(63) Continuation of application No. 17/740,176, filed on May 9, 2022, now Pat. No. 11,979,627, which is a
(Continued)

(51) Int. Cl.
H04N 21/2662 (2011.01)
H04N 19/40 (2014.01)
(Continued)

(52) U.S. Cl.
CPC ......... *H04N 21/2662* (2013.01); *H04N 19/40* (2014.11); *H04N 19/46* (2014.11);
(Continued)

(58) Field of Classification Search
CPC ....... H04N 21/2662; H04N 21/234309; H04N 21/23439; H04N 21/2402; H04N 21/258;
(Continued)

(56) References Cited

U.S. PATENT DOCUMENTS 6,989,773 B2 1/2006 Wee et al.
7,065,712 B2 6/2006 Muto et al.
(Continued)

FOREIGN PATENT DOCUMENTS

CN 1713721 A 12/2005
CN 102948125 A 2/2013
(Continued)

OTHER PUBLICATIONS

A. Hore, D. Ziou, "Image quality metrics: PSNR vs. SSIM", ICPR 2010, 4 pages.
(Continued)

*Primary Examiner* — Benjamin R Bruckart
*Assistant Examiner* — Alexander Boyd
(74) *Attorney, Agent, or Firm* — HG LAW LLP

(57) ABSTRACT

Techniques described herein are directed toward creating one or more "dynamic profiles" for media (video) streaming in which an encoding bit rate (and optionally other profile settings) is optimized for particular content. More specifically, techniques involve performing one or more "probe" encodings of the particular content to determine an encoding bit rate (and optionally other profile settings) that results in an encoding having a quality value sufficiently near (within a threshold) a target quality value.

18 Claims, 15 Drawing Sheets

Related U.S. Application Data continuation of application No. 15/829,723, filed on Dec. 1, 2017, now Pat. No. 11,363,322.

(60) Provisional application No. 62/428,946, filed on Dec. 1, 2016.

(51) Int. Cl.

| | |
|---|---|
| *H04N 19/46* | (2014.01) |
| *H04N 21/2343* | (2011.01) |
| *H04N 21/24* | (2011.01) |
| *H04N 21/258* | (2011.01) |
| *H04N 21/262* | (2011.01) |
| *H04N 21/845* | (2011.01) |
| *H04N 21/647* | (2011.01) |

(52) U.S. Cl.
CPC .............. *H04N 21/234309* (2013.01); *H04N 21/23439* (2013.01); *H04N 21/2402* (2013.01); *H04N 21/258* (2013.01); *H04N 21/26258* (2013.01); *H04N 21/8456* (2013.01); *H04N 21/64769* (2013.01)

(58) Field of Classification Search
CPC ......... H04N 21/26258; H04N 21/8456; H04N 21/64769; H04N 19/40; H04N 19/46
USPC ........................................ 725/116
See application file for complete search history.

(56) References Cited

U.S. PATENT DOCUMENTS

| | | | |
|---|---|---|---|
| 7,203,758 | B2 | 4/2007 | Cook et al. |
| 7,945,573 | B1 | 5/2011 | Barnes et al. |
| 8,051,166 | B1 | 11/2011 | Baumback et al. |
| 8,112,471 | B2 | 2/2012 | Wei et al. |
| 8,145,782 | B2 | 3/2012 | Mcgowan et al. |
| 8,234,350 | B1 | 7/2012 | Gu et al. |
| 8,301,733 | B2 | 10/2012 | Mcgowan |
| 8,327,012 | B1 | 12/2012 | Nguyen et al. |
| 8,327,013 | B2 | 12/2012 | Mcgowan et al. |
| 8,442,858 | B1 | 5/2013 | Barnes et al. |
| 8,495,675 | B1 | 7/2013 | Philpott et al. |
| 8,510,773 | B1 | 8/2013 | Abou-Rizk et al. |
| 8,539,523 | B2 | 9/2013 | Philpott et al. |
| 8,561,102 | B1 | 10/2013 | Mack et al. |
| 8,645,504 | B2 | 2/2014 | Mcgowan |
| 8,762,564 | B1 | 6/2014 | Philpott et al. |
| 8,881,243 | B2 | 11/2014 | Magyar et al. |
| 8,887,214 | B1 | 11/2014 | Black et al. |
| 9,066,138 | B1 | 6/2015 | Kraiman et al. |
| 9,197,559 | B1 | 11/2015 | Cloonan et al. |
| 9,336,060 | B2 | 5/2016 | Nori et al. |
| 9,363,329 | B1 | 6/2016 | Kolam et al. |
| 9,380,092 | B2 | 6/2016 | Patel et al. |
| 9,426,089 | B2 | 8/2016 | Gordon |
| 9,509,742 | B2 | 11/2016 | Gordon |
| 9,532,092 | B1 | 12/2016 | Suryanarayanan et al. |
| 9,582,157 | B1 | 2/2017 | Chatterjee et al. |
| 9,613,042 | B1 | 4/2017 | Joseph et al. |
| 9,661,049 | B2 | 5/2017 | Gordon |
| 9,762,639 | B2 | 9/2017 | Mcgowan et al. |
| 9,800,639 | B2 | 10/2017 | Gordon |
| 10,084,838 | B2 | 9/2018 | Gordon et al. |
| 10,116,720 | B2 | 10/2018 | Gordon |
| 10,142,386 | B2 | 11/2018 | Gordon |
| 10,148,716 | B1 | 12/2018 | Joseph et al. |
| 10,182,096 | B1 | 1/2019 | Siddiqi et al. |
| 10,264,042 | B2 | 4/2019 | Gordon |
| 10,630,771 | B1 | 4/2020 | Garza et al. |
| 10,862,994 | B1 | 12/2020 | Ganjam et al. |
| 10,911,509 | B2 | 2/2021 | Gordon |
| 11,075,970 | B2 | 7/2021 | Gordon |
| 11,076,153 | B2 | 7/2021 | Pattichis et al. |

| | | | |
|---|---|---|---|
| 11,363,322 | B2 | 6/2022 | Reznik et al. |
| 11,533,352 | B2 | 12/2022 | Gordon |
| 11,710,151 | B2 | 7/2023 | Mcgowan et al. |
| 11,757,964 | B2 | 9/2023 | Gordon et al. |
| 11,765,219 | B2 | 9/2023 | Gordon |
| 11,936,708 | B2 | 3/2024 | Gordon |
| 11,979,627 | B2 | 5/2024 | Reznik et al. |
| 12,056,738 | B2 | 8/2024 | Mcgowan et al. |
| 2002/0128908 | A1 | 9/2002 | Levin et al. |
| 2003/0066078 | A1 | 4/2003 | Bjorgan et al. |
| 2004/0210320 | A1 | 10/2004 | Pandya |
| 2005/0010653 | A1 | 1/2005 | McCanne |
| 2005/0235047 | A1 | 10/2005 | Li et al. |
| 2006/0004627 | A1 | 1/2006 | Baluja |
| 2008/0086523 | A1 | 4/2008 | Afergan et al. |
| 2008/0109657 | A1 | 5/2008 | Bajaj et al. |
| 2008/0187279 | A1 | 8/2008 | Gilley et al. |
| 2008/0208668 | A1 | 8/2008 | Heller et al. |
| 2009/0031339 | A1 | 1/2009 | Pickens et al. |
| 2009/0073006 | A1 | 3/2009 | Wegener |
| 2009/0196339 | A1 | 8/2009 | Hirabayashi |
| 2009/0249418 | A1 | 10/2009 | Alastruey et al. |
| 2009/0307722 | A1 | 12/2009 | Gross |
| 2010/0046633 | A1 | 2/2010 | Kasai et al. |
| 2010/0251289 | A1 | 9/2010 | Agarwal et al. |
| 2010/0322213 | A1 | 12/2010 | Liu et al. |
| 2011/0015989 | A1 | 1/2011 | Tidwell et al. |
| 2011/0053513 | A1 | 3/2011 | Papakostas et al. |
| 2011/0088076 | A1 | 4/2011 | Li et al. |
| 2011/0138064 | A1 | 6/2011 | Rieger et al. |
| 2011/0161409 | A1 | 6/2011 | Nair et al. |
| 2011/0173345 | A1 | 7/2011 | Knox et al. |
| 2011/0246563 | A1 | 10/2011 | Keum et al. |
| 2011/0252082 | A1 | 10/2011 | Cobb et al. |
| 2011/0258049 | A1 | 10/2011 | Ramer et al. |
| 2011/0320287 | A1 | 12/2011 | Holt et al. |
| 2012/0005312 | A1 | 1/2012 | Mcgowan et al. |
| 2012/0047542 | A1 | 2/2012 | Lewis et al. |
| 2012/0054664 | A1* | 3/2012 | Dougall ............. H04N 21/6582 715/772 |
| 2012/0066386 | A1 | 3/2012 | Mcgowan et al. |
| 2012/0072465 | A1 | 3/2012 | Mcgowan et al. |
| 2012/0116883 | A1 | 5/2012 | Asam et al. |
| 2012/0117239 | A1 | 5/2012 | Holloway et al. |
| 2012/0137015 | A1 | 5/2012 | Sun |
| 2012/0151009 | A1 | 6/2012 | Bouazizi et al. |
| 2012/0179788 | A1 | 7/2012 | Mcgowan |
| 2012/0185608 | A1 | 7/2012 | Mcgowan et al. |
| 2012/0185895 | A1 | 7/2012 | Wong et al. |
| 2012/0198492 | A1 | 8/2012 | Dhruv et al. |
| 2012/0254456 | A1 | 10/2012 | Visharam et al. |
| 2012/0259946 | A1 | 10/2012 | Stockhammer et al. |
| 2012/0265901 | A1* | 10/2012 | Swenson ........ H04N 21/234309 709/246 |
| 2012/0272285 | A1* | 10/2012 | Brooks ............ H04N 21/47202 725/146 |
| 2012/0284371 | A1 | 11/2012 | Begen et al. |
| 2013/0054728 | A1 | 2/2013 | Amir et al. |
| 2013/0064283 | A1 | 3/2013 | Sun et al. |
| 2013/0080267 | A1 | 3/2013 | Mcgowan |
| 2013/0091251 | A1 | 4/2013 | Walker et al. |
| 2013/0094564 | A1 | 4/2013 | Yang et al. |
| 2013/0097309 | A1 | 4/2013 | Ma et al. |
| 2013/0103849 | A1 | 4/2013 | Mao et al. |
| 2013/0110978 | A1 | 5/2013 | Gordon et al. |
| 2013/0117120 | A1 | 5/2013 | Shafiee |
| 2013/0159388 | A1 | 6/2013 | Forsman et al. |
| 2013/0163758 | A1 | 6/2013 | Swaminathan et al. |
| 2013/0198328 | A1 | 8/2013 | Green et al. |
| 2013/0198335 | A1 | 8/2013 | Goel et al. |
| 2013/0204973 | A1 | 8/2013 | Yie et al. |
| 2013/0219428 | A1 | 8/2013 | Jennings et al. |
| 2013/0246577 | A1 | 9/2013 | Gonzales et al. |
| 2013/0260796 | A1 | 10/2013 | Hasek |
| 2013/0268963 | A1 | 10/2013 | Nugent et al. |
| 2013/0290465 | A1 | 10/2013 | Harrison et al. |
| 2013/0290557 | A1 | 10/2013 | Baratz |
| 2013/0317919 | A1 | 11/2013 | Raman et al. |
| 2013/0329781 | A1 | 12/2013 | Su et al. |

(56) References Cited

U.S. PATENT DOCUMENTS

| 2013/0332971 A1 | 12/2013 | Fisher |
| 2014/0006951 A1 | 1/2014 | Hunter |
| 2014/0019593 A1 | 1/2014 | Reznik et al. |
| 2014/0020036 A1 | 1/2014 | Hasek et al. |
| 2014/0032658 A1 | 1/2014 | Falls |
| 2014/0032849 A1 | 1/2014 | De et al. |
| 2014/0044197 A1 | 2/2014 | Liao et al. |
| 2014/0089465 A1 | 3/2014 | Van et al. |
| 2014/0109103 A1 | 4/2014 | Proffit et al. |
| 2014/0119432 A1 | 5/2014 | Wang |
| 2014/0143046 A1 | 5/2014 | Doe et al. |
| 2014/0149210 A1 | 5/2014 | Ma et al. |
| 2014/0149557 A1 | 5/2014 | Lohmar et al. |
| 2014/0150019 A1 | 5/2014 | Ma et al. |
| 2014/0208374 A1 | 7/2014 | Delaunay et al. |
| 2014/0229529 A1 | 8/2014 | Barone et al. |
| 2014/0229579 A1 | 8/2014 | Johnson |
| 2014/0230003 A1 | 8/2014 | Ma et al. |
| 2014/0236739 A1 | 8/2014 | Mactiernan et al. |
| 2014/0241419 A1 | 8/2014 | Holmer |
| 2014/0244828 A1 | 8/2014 | Besehanic |
| 2014/0250230 A1 | 9/2014 | Brueck et al. |
| 2014/0259044 A1 | 9/2014 | Kirby et al. |
| 2014/0280480 A1 | 9/2014 | Kazerani et al. |
| 2014/0280906 A1 | 9/2014 | Johns et al. |
| 2014/0282765 A1 | 9/2014 | Casey et al. |
| 2014/0316899 A1 | 10/2014 | Mcgowan et al. |
| 2014/0337127 A1 | 11/2014 | Morel et al. |
| 2014/0337411 A1 | 11/2014 | Panje et al. |
| 2014/0358925 A1 | 12/2014 | Jakobowski |
| 2014/0359081 A1 | 12/2014 | Van et al. |
| 2014/0379871 A1 | 12/2014 | Van Brandenburg et al. |
| 2015/0026468 A1 | 1/2015 | Riegel et al. |
| 2015/0032857 A1 | 1/2015 | Hamm et al. |
| 2015/0074232 A1 | 3/2015 | Phillips et al. |
| 2015/0120821 A1 | 4/2015 | Bendell |
| 2015/0127844 A1 | 5/2015 | Phillips et al. |
| 2015/0127845 A1 | 5/2015 | Phillips et al. |
| 2015/0172354 A1 | 6/2015 | Coppola et al. |
| 2015/0180924 A1 | 6/2015 | O'Callaghan |
| 2015/0229471 A1 | 8/2015 | Nair et al. |
| 2015/0256577 A1 | 9/2015 | Gutierrez et al. |
| 2015/0271179 A1 | 9/2015 | Wang et al. |
| 2015/0271541 A1 | 9/2015 | Gonder et al. |
| 2015/0288647 A1 | 10/2015 | Chhabra et al. |
| 2015/0296274 A1 | 10/2015 | Good et al. |
| 2015/0304196 A1 | 10/2015 | Sun et al. |
| 2015/0382042 A1 | 12/2015 | Wagenaar et al. |
| 2016/0006817 A1 | 1/2016 | Mitic et al. |
| 2016/0028647 A1 | 1/2016 | Ramakrishnan et al. |
| 2016/0044125 A1 | 2/2016 | Hardin et al. |
| 2016/0080470 A1 | 3/2016 | Shanson |
| 2016/0127260 A1 | 5/2016 | Gordon |
| 2016/0127440 A1 | 5/2016 | Gordon |
| 2016/0127803 A1 | 5/2016 | Shanson et al. |
| 2016/0149978 A1 | 5/2016 | Wissingh et al. |
| 2016/0182475 A1 | 6/2016 | Uzun |
| 2016/0191658 A1 | 6/2016 | Kolam et al. |
| 2016/0191954 A1* | 6/2016 | Ekstrom .......... H04N 21/26606 380/201 |
| 2016/0192029 A1 | 6/2016 | Bergstrom |
| 2016/0248884 A1 | 8/2016 | Larabi et al. |
| 2016/0295216 A1 | 10/2016 | Aaron et al. |
| 2016/0321286 A1* | 11/2016 | Chen ..................... G06F 16/137 |
| 2016/0323606 A1* | 11/2016 | Mao ................. H04N 21/64707 |
| 2016/0330261 A1 | 11/2016 | Gordon |
| 2016/0337426 A1 | 11/2016 | Shribman et al. |
| 2017/0006253 A1 | 1/2017 | Martin |
| 2017/0035351 A1 | 2/2017 | Prerau et al. |
| 2017/0078350 A1 | 3/2017 | Gordon |
| 2017/0149570 A1 | 5/2017 | Counterman |
| 2017/0195242 A1 | 7/2017 | Ibrahim |
| 2017/0272485 A1 | 9/2017 | Gordon et al. |
| 2017/0339438 A1 | 11/2017 | Slaughter et al. |
| 2017/0353516 A1 | 12/2017 | Gordon |
| 2017/0353522 A1 | 12/2017 | Van et al. |
| 2018/0013809 A1 | 1/2018 | Gordon |
| 2018/0013810 A1 | 1/2018 | Gordon |
| 2018/0124146 A1* | 5/2018 | Chen ................... H04N 21/258 |
| 2018/0124442 A1 | 5/2018 | Van et al. |
| 2018/0160161 A1 | 6/2018 | Reznik et al. |
| 2018/0376177 A1 | 12/2018 | Nugent et al. |
| 2019/0014358 A1 | 1/2019 | Takabayashi et al. |
| 2019/0173930 A1 | 6/2019 | Gordon et al. |
| 2019/0173931 A1 | 6/2019 | Gordon |
| 2019/0182302 A1 | 6/2019 | Gordon |
| 2019/0215351 A1 | 7/2019 | Gordon |
| 2019/0297377 A1 | 9/2019 | Tirpak |
| 2020/0344320 A1 | 10/2020 | Ganjam et al. |
| 2021/0160299 A1 | 5/2021 | Gordon |
| 2022/0159051 A1 | 5/2022 | Gordon |
| 2023/0308704 A1 | 9/2023 | Reznik et al. |
| 2024/0029111 A1 | 1/2024 | Mcgowan et al. |
| 2024/0187471 A1 | 6/2024 | Gordon |
| 2024/0223637 A1 | 7/2024 | Gordon et al. |
| 2024/0354806 A1 | 10/2024 | McGowan et al. |
| 2024/0406239 A1 | 12/2024 | Gordon |
| 2025/0156905 A1 | 5/2025 | Mcgowan et al. |
| 2025/0166012 A1 | 5/2025 | Mcgowan et al. |

FOREIGN PATENT DOCUMENTS

| CN | 103210642 A | 7/2013 |
| CN | 103370709 A | 10/2013 |
| CN | 103583050 A | 2/2014 |
| CN | 107113454 A | 8/2017 |
| EP | 3213515 A2 | 9/2017 |
| GB | 2529766 A | 3/2016 |
| JP | 2009-182889 A | 8/2009 |
| TW | 201424314 A | 6/2014 |
| WO | 2012/100117 A1 | 7/2012 |
| WO | 2013/030096 A1 | 3/2013 |
| WO | 2013/098317 A1 | 7/2013 |
| WO | 2013/098319 A1 | 7/2013 |
| WO | 2013/147983 A1 | 10/2013 |
| WO | 2014/176014 A1 | 10/2014 |
| WO | 2016/069896 A2 | 5/2016 |
| WO | 2016/134345 A1 | 8/2016 |
| WO | 2016/160295 A1 | 10/2016 |
| WO | 2017/219353 A1 | 12/2017 |

OTHER PUBLICATIONS

A.N. Moldovan, I. Ghergulescu and C.H. Muntean, "A novel methodology for mapping objective video quality metrics to the subjective MOS scale," BMSB, Beijing, 2014, pp. 1-7.

International Search Report dated Jul. 18, 2018, PCT/US2017/064319, all pages.

P.J.G. Barten, Contrast Sensitivity of the Human Eye and Its Effects on Image Quality, SPIE Press, 1999. http://spie.org/Publications/Book/353254, 226 pages.

Z. Wang, A Bovik, H. Sheikh, E. Simoncelli, "Image quality assessment: from error visibility to structural similarity". IEEE Transactions on Image Processing 13 (4): 600-612 (Apr. 1, 2004), 14 pages.

* cited by examiner

120

Content Owner

110

Transcoding Service

130

Media Provider(s)

Internet

170

140

End User Device

Client

145

160

Ad Network(s)

150

Media File Delivery Service Provider

100

| 810 | ◆ | FINE-GRAIN D(R) SAMPLE |
| 820 | ◆ | 1ST PROBE (CRF=26) |
| 830 | ◇ | 2ND PROBE (CRF=23,486) |
| 840 | —— | MODEL DRAWN USING 2 PROBE POINTS |
| 850 | - - - | FINDING TARGET RATE FOR SSIM=0.95 |

OPTIMIZATION OF ENCODING PROFILES FOR MEDIA STREAMING

PRIORITY

This application is a continuation of U.S. patent application Ser. No. 17/740,176, filed May 9, 2022, and entitled "Optimization of Encoding Profiles for Media Streaming", which is a continuation of U.S. patent application Ser. No. 15/829,723, filed Dec. 1, 2017, now U.S. Pat. No. 11,363, 322, issued on Jun. 14, 2022, and entitled "Optimization of Encoding Profiles for Media Streaming", which claims the benefit of U.S. Provisional Application No. 62/428,946, filed Dec. 1, 2016, and entitled "Optimization of Encoding Profiles for ABR Streaming", all of which are both assigned to the assignee hereof and incorporated by reference herein in their entirety for all purposes.

BACKGROUND

Traditionally, adaptive bit-rate (ABR) streaming encoders operate using a profile (or set of profiles), prescribing a number of streams (also referred to herein as "renditions" or "encodings") to be generated and particular parameters (target resolutions, framerates, bitrates, codecs, codec-related constraints, file formats, etc.) to be used for each encoded stream. In most cases, such profiles are defined statically; they do not change based on factors such as the content, its intended geographic reach, distribution of devices, and networks used to pull and play it, etc. However, such design is suboptimal: video content may vary in its complexity, thus posing different requirements for encoding bitrates.

For example, a high-action movie or sports content at HD resolution may need a bit rate (also referred to herein simply as "rate") of 6-10 megabits per second (Mbps) to look acceptable, while some low-motion scenes or cartoons may look acceptable at less than 1 Mbps. Likewise, geographic reach of the content may greatly affect the choice of network and device types and their capabilities. For example, a content intended for distribution in South Korea (with networks having relatively high bandwidth and reliability) may benefit from inclusion of ultra-high-rate and/or high-resolution streams, while one produced for distribution in Somalia (with networks having relatively low bandwidth and reliability) may be better served by more encodings in 100 kilobit per second (kbps) to 1 Mbps range, reflecting capabilities of the local networks.

Additional factors that can affect best choices of encoding profiles include: target level of quality (e.g., minimum acceptable Mean Opinion Score (MOS), Structural Similarity Index Metric (SSIM), or Picture Quality Rating (PQR) for each encoding), content usage statistics, intended lifespan of the encoded content (e.g., instant: live/news content, short-living: ads, etc., long-living: Video On Demand (VOD) premium content, etc.), publisher's priority for reaching different device types (connected TVs vs PCs and mobile devices), etc.

Traditional solutions on the market for creating optimal ABR encoding profiles fail to consider such combination of factors, resulting in sub-optimal encoding bit rates.

SUMMARY

Techniques described herein are directed toward creating "dynamic profiles" for media (video) streaming in which the choices of encoding bit rates (and optionally other encoding parameters, such as video resolutions, framerates, codec profiles, levels, the number of encoded streams, etc.) are optimized for particular content and delivery context. More specifically, techniques involve performing one or more "probe" encodings of the particular content to determine quality-rate model for this particular content, and then using this model in an optimization process to determine encoding bit rate(s) (and optionally other profile parameters) that results in an encoding profile achieving best performance according to a certain optimization criterion. For example, such criterion can be minimization of bandwidth usage while delivering quality above certain target quality level.

An example method of optimization in encoding source content, according to the description, comprises obtaining, by a computer system, the source content, wherein the source content comprises a video in a first electronic format, determining encoding parameters for at least one probe encoding, and conducting the at least one probe encoding. The example method further comprises determining encoding parameters for a final encoding based, at least in part, on results from the at least one probe encoding, and generating, with of the computer system, a profile for encoding the source content. The profile for encoding the source content indicates how the source content is to be encoded to a second electronic format, and includes information indicative of the encoding parameters for the final encoding.

Embodiments of the method may include one or more the following features. The method may further comprise determining that a difference between a quality value of a first probe encoding of the at least one probe encoding and a target quality value exceeds a certain threshold value, and in response to the determination that the difference between the quality value of the first probe encoding and the target quality value exceeds the certain threshold value, determining a bit rate for a second probe encoding of the at least one probe encoding based, at least in part, on a bit rate for the first probe encoding. The target quality value comprises a perceptually-weighted target quality value. The method may further comprise determining a video resolution based on the target quality value. Determining the encoding parameters for the final encoding may comprise fitting a quality model to a quality value of a first probe encoding of the at least one probe encoding and a quality value of a second probe encoding of the at least one probe encoding. The method may further comprise determining a gain and shape of the quality model based, at least in part, on the quality value of the first probe encoding. Generating the profile for encoding the source content may comprise solving an optimization problem for a certain Figure of Merit function to determine one or more of the encoding parameters for the final encoding. The profile may comprise an encoding ladder in which the final encoding comprises one of a plurality of encodings, the method further comprising using the Figure of Merit function to determine a video resolution and a bit rate of at least one additional encoding of the plurality of encodings. The method may comprise encoding the source content to the second electronic format in accordance with the profile for encoding the source content, and storing the source content encoded to the second electronic format. Determining the encoding parameters for the at least one probe encoding may be further based on a target video resolution. Determining the encoding parameters for the final encoding, maybe further based on a target quality value indicative of a Structural Similarity Index Metric (SSIM).

An example server, according to the description, comprises a communication interface, a memory, and a processing unit communicatively coupled with the communication interface and the memory. The processing unit is configured to cause the server to obtain source content comprising a video in a first electronic format, determine encoding parameters for at least one probe encoding, and conduct the at least one probe encoding. The processing unit is further configured to determine encoding parameters for a final encoding based, at least in part, on results from the at least one probe encoding, generate a profile for encoding the source content. The profile for encoding the source content indicates how the source content is to be encoded to a second electronic format, and includes information indicative of the encoding parameters for the final encoding.

Embodiments of the server may include one or more the following features. The processing unit may be further configured to cause the server to determine that a difference between a quality value of a first probe encoding of the at least one probe encoding and a target quality value exceeds a certain threshold value, and in response to the determination that the difference between the quality value of the first probe encoding and the target quality value exceeds the certain threshold value, determining a bit rate for a second probe encoding of the at least one probe encoding based, at least in part, on a bit rate for the first probe encoding. The target quality value may comprise a perceptually-weighted target quality value. The processing unit may be configured to cause the server to determine a video resolution based on the target quality value. The processing unit may be configured to cause the server to determine the encoding parameters for the final encoding by fitting a quality model to the quality value of a first probe encoding of the at least one probe encoding and the quality value of a second probe encoding of the at least one probe encoding. The processing unit may be configured to cause the server to determine a gain and shape of the quality model based, at least in part, on the quality value of the first probe encoding. The processing unit may be configured to cause the server to encode the source content to the second electronic format in accordance with the profile for encoding the source content, and store, in the memory, the source content encoded to the second electronic format. The processing unit may be configured to cause the server to determine the encoding parameters for the at least one probe encoding further based on a target video resolution. The processing unit may be configured to cause the server to determine the encoding parameters for the final encoding further based on a target quality value indicative of a Structural Similarity Index Metric (SSIM).

An example method of transcoding source content, according to the description, comprises receiving, from a requesting entity, a transcoding job creation request including a location of the source content, generating a profile generation request including the location of the source content, sending the profile generation request to a profile generation operation, and in response to sending the profile generation request, receiving one or more encoding profiles from the profile generation operation. The method further comprises generating a transcoding request that includes the location of the source content and information indicative of the one or more encoding profiles, sending, the transcoding request to a transcoding operation, receiving an indication that at least a portion of the transcoding is complete, and in response to receiving the indication that at least a portion of the transcoding is complete, sending a message to the requesting entity that the at least a portion of the transcoding is complete.

Embodiments of the method may further comprise one or more of the following features. The transcoding job creation request may be received via an application programming interface (API). The transcoding job creation request may include an indication that final target parameters of video encodings are to be selected automatically. The one or more encoding profiles may comprise a plurality of encoding profiles, and generating the transcoding request may comprise generating a separate transcoding request for each encoding profile of the plurality of encoding profiles. Sending the transcoding request to the transcoding operation may comprise, for each encoding profile of the plurality of encoding profiles, sending the separate transcoding request to a respective transcoding operation. The transcoding request may further include information regarding a location for the transcoding operation to put transcoded content. The transcoding job creation request may further include information regarding a location for the transcoded content to be located once the source content is transcoding. The transcoding request may be sent from a first server, and the transcoding operation is executed by a second server different from the first server. The profile generation request. Maybe sent from a first server, and the profile generation operation may be executed by a second server different from the first server.

An example server, according to the description, comprises a communication interface, a memory, and a processing unit communicatively coupled with the communication interface and the memory. The processing unit is configured to cause the server to receive, via the communication interface from a requesting entity, a transcoding job creation request including a location of the source content, generate a profile generation request including the location of the source content, send the profile generation request to a profile generation operation, and in response to sending the profile generation request, receive one or more encoding profiles from the profile generation operation. The processing unit is further configured to cause the server to generate a transcoding request that includes the location of the source content and information indicative of the one or more encoding profiles, send, the transcoding request to a transcoding operation, receive an indication that at least a portion of the transcoding is complete, and in response to receiving the indication that at least a portion of the transcoding is complete, sending, via the communication interface, a message to the requesting entity that the at least a portion of the transcoding is complete.

Embodiments of the server may include one or more of the following features. The server may be configured to provide an application programming interface (API), and the transcoding job creation request is received via the API. If the one or more encoding profiles comprises a plurality of encoding profiles, the processing unit may be further configured to cause the server to generate the transcoding request by generating a separate transcoding request for each encoding profile of the plurality of encoding profiles. The processing may be further configured to cause the server to send the transcoding request to the transcoding operation by sending, for each encoding profile of the plurality of encoding profiles, the separate transcoding request to a respective transcoding operation. The processing may be configured to cause the server to include, in the transcoding request, information regarding a location for the transcoding operation to put transcoded content. The processing may be further configured to cause the server to send the transcoding request by sending the transcoding request to a second server executing the transcoding operation. The processing may be further configured to cause the server to send the profile generation request by sending the profile generation request to a second server executing the profile generation operation.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments described herein are generally directed toward creating optimized profiles for transcoding media (and in particular, a video) from a first electronic format to a second electronic format. A profile indicates how source content (in the first electronic format) is to be encoded to the second electronic format. In particular, a profile defines a set of parameters (such as bit rate, resolution, codec, etc.) to use in the transcoding process. It will be understood that the source content to be transcoding may comprise a digital master, mezzanine file, input stream, separated video elementary stream, or the like. Furthermore, as used herein, the terms "renditions," "streams," and "encodings" may be used synonymously to refer to the transcoding media. Additionally, the terms "encode" and "encoding" (when used as a verb) may be used synonymously with "transcode" and "transcoding," respectively, describing the process of converting the source content from one electronic format to another.

Transcoding digital media for consumption can occur in a variety of different environments. It can, for example, take place locally on a computer system. As Internet bandwidth steadily increases to accommodate video consumption, such transcoding may occur increasingly over the Internet and/or other distributed communication networks.

Figure 1:
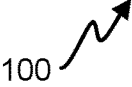
FIG. 1 is a block diagram illustrating a media servicing system, according to an embodiment.

FIG. 1 is a block diagram illustrating a media servicing system 100, in which a transcoding service may be provided over the Internet 170, according to an embodiment. The system may deliver media content to a client 145, executed by an end user device 140 providing media playback to an end user. The client 145 can be, for example, a media player, browser, or other application adapted to request and/or play media files. The media content can be provided via a network such as the Internet 170 and/or other data communications networks, such as a distribution network for television content. The end user device 140 can be one of any number of devices configured to receive media over the Internet 170, such as a mobile phone, tablet, personal computer, portable media device, set-top box, video game system, head-mounted display, etc. Although only one client 145 and one end user device 140 are shown in FIG. 1, it will be understood that the media servicing system 100 can provide media to many (hundreds, thousands, millions, etc.) of clients 145 on many (hundreds, thousands, millions, etc.) of end user devices 140.

For on-demand content (e.g., requested media that is stored in its entirety), a media file provided by one or more media providers 130 can be transcoded by a transcoding service 110, which may comprise one or more computer servers that can ingest source content and transcode it according to various profiles. In some embodiments, the transcoding service may perform the profile optimization described herein. In some embodiments, the transcoding service may provide indexing and/or other services. The transcoding service 110 can provide the transcoded media back to the media provider 130 (e.g., from which the source content was obtained) and/or provide the transcoded media (e.g., a media file) to a media file delivery service provider (MFDSP) 150, such as a content delivery network (CDN), media streaming service provider, cloud data services provider, or other third-party media file delivery service provider. Additionally or alternatively, the transcoding service 110 may also be adapted to store and/or stream the media file to the client 145. On-demand content can be provided to the client 145 via progressive downloading and/or streaming, for example.

For live content (e.g., requested content that is sent to one or more end user devices 140 as it is received from media provider(s) 130, that is, in real time or near-real time, depending on processing times and/or other buffer times), a similar process can take place. For example, media provider(s) 130 can provide a media stream (e.g., live video), which is transcoded by the transcoding service 110. Encoded segments of the media stream can be stored as files (i.e., "chunks"), on the MFDSP 150 and/or the transcoding service 110.

A content owner 120 can utilize one or more media provider(s) 130 to distribute media content owned by the content owner 120. For example, a content owner 120 could be a movie studio that licenses distribution of certain media through various content providers 130 such as television networks, Internet media streaming websites and other on-demand media providers, media conglomerates, and the like. In some configurations, the content owner 120 also can operate as a media provider 130.

The content owner 120 and/or media provider(s) 130 can enter into an agreement with one or more ad network(s) 160 to provide advertisements to numerous clients 145 on numerous end user devices 140. In this manner, the ad network(s) 160 allow companies to show advertisements to end users viewing the media content from the media provider(s) 130. Because ad network(s) 160 can maintain advertisements and/or advertisement data separate from media content, the advertisements can be updated and subject to business rules such that, two users viewing the same media content at different times and/or in different locations may see different advertisements.

As previously noted, the media servicing system 100 of in FIG. 1 is just one example in which the techniques for optimizing encoding profiles for media streaming provided herein may be used. It can be further noted that, in some embodiments, some of the entities illustrated in FIG. 1, such as media provider(s) 130, transcoding service 110, and/or possibly MFDSP 150 can all be part of a single business entity or service. Such unified services are usually called Online Video Platforms (OVP). For example, Brightcove® VideoCloud™ services is an OVP.

Figure 2:
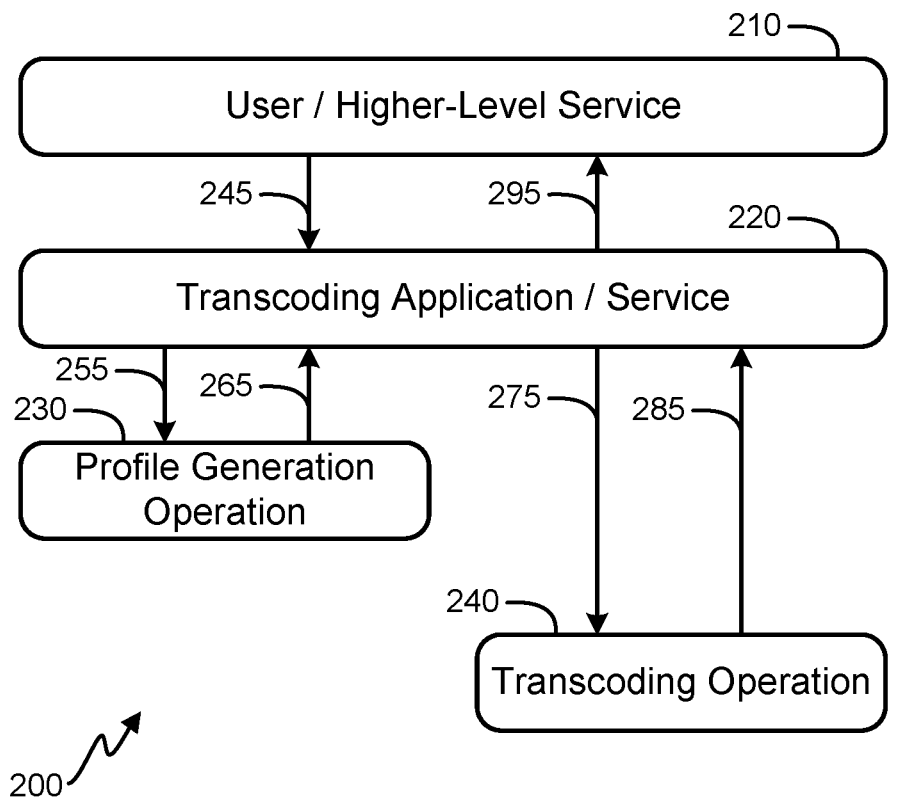
FIG. 2 is a simplified block diagram of various functions that can be performed by one or more entities, such as the entities of the media servicing system of FIG. 1, according to an embodiment.

FIG. 2 is a simplified block diagram of various functions that can be performed by one or more entities, such as the entities of the media servicing system 100 of FIG. 1, according to an embodiment. For example, the user/higher-level service 210 may correspond to a requesting entity such as the content owner 120, media provider(s) 130, transcoding service 110, and/or OVP. (The "/" demarcation within labels indicates alternative features that may be implemented, depending on the embodiment.) The transcoding application/service 220, profile generation operation 230, and/or transcoding operation 240 may be performed by the transcoding service 110. That said, a person of ordinary skill in the art will appreciate that one or more of the functions illustrated in FIG. 2 may be performed by a single device or various communicatively connected devices, which may be located at different geographical locations, in some embodiments. In some embodiments, for example, the user/higher-level service 210 may comprise a computer of a content owner or media provider, where one or more of the transcoding application/service 220, profile generation operation 230, and/or transcoding operation 240 are executed in the "cloud" (e.g., by one or more remote computer systems/servers connected via a data communication network, such as the Internet). In embodiments where different functions are performed by different applications (which may be executed by a single device or multiple devices), and one or more Application Programming Interfaces (APIs) may be used to communicate between the various different applications. (For example, such APIs may be local software APIs or distributed computing APIs (including web APIs or APIs specific to any particular language or cloud platform being used), as the case may be.) Also, depending on specifics of implementation or deployment scenario, profile generation operation 230 may comprise a locally-invoked function within a same thread/process, a function executed by another thread or process on a local computing platform, or a function/thread/process executed on one or more computers remote to a computer executing the user/higher-level service 210. A person of ordinary skill in the art will recognize many other variations.

To begin the process, a transcoding job creation request 245 can be sent from the user/higher-level service 210 to the transcoding application/service 220. This request may include many standard transcoding job parameters such as location of an input sequence (source content); location where transcoded content is to be placed; parameters of compressed representation to produce choices of target resolutions, frame rates, Group Of Pictures (GOP) sizes, codec/profiles, file formats, etc. Here, as described in further detail below, the request may also include an indication that final target parameters of video encodings are to be selected automatically.

If this indication is present, the transcoding application/service 220 can then send a profile generation request 255 to the profile generation operation 230. This profile generation request 255 may include a subset of the parameters passed in transcoding job creation request 245, plus some additional parameters, such as a local location of the source content as it was ingested and/or processed by the transcoding application/service 220.

Once it receives the profile generation request 255, the profile generation operation 230 generates one or more encoding profiles using the techniques described herein, and provides the encoding profile(s) back to the transcoding application/service 220 in a profile generation response 265. The transcoding application/service 220 can then pass the encoding profile(s) obtained from the profile generation operation 230 to the transcoding operation 240 in a transcoding request 275. When the transcoding operation 240 completes the transcoding, it provides the transcoded content to the transcoding application/service 220 in a transcoding response 285, and the transcoding application/service can provide an indication that at least a portion of the content has been transcoded and/or provide the transcoded content itself (depending on desired functionality) in a transcoding job response 295. (If encoding profile generated in response 265 from profile generator includes multiple targets and/or outputs, then transcoding of media according to these targets can be done in parallel. This may be performed by separate transcoding operations, according to some embodiments. In the embodiment illustrated in FIG. 2, transcoding operation 240 can be executed multiple times and the transcoding application/service 220 can return results back to the user/higher-level service 210 after all results are collected by responses 285.)

As an example, an example job creation request 245 in Brightcove® Zencoder™ that supports automatic profile generation according to the techniques herein may comprise an HTTP POST request to "https://app.zencoder.com/api/v2/jobs." The POST body may comprise a JavaScript Object Notation (JSON) file specifying the Uniform Resource Locator (URL) of a video to process, API key, output destination, and notification settings. It may further indicate that dynamic profile is to be generated and set applicable profile constraints (e.g. min/max bitrate, codec type, list of allowed resolutions, target quality value, etc.), if any.

The following is an example JSON file:

```
{
  "input": "s3://bucket/file.mov",
  "generate_dynamic_profile":  true,
  "dynamic_profile_options":  {
    "min_renditions":  2,
    "max_renditions":  7,
    "video_configurations":  [
        {"width":  1280,  "height":  720,  "frame_rate":50},
        {"width":  1280,  "height":  720,  "frame_rate":25},
        {"width":  960,  "height":  540,  "frame_rate":25},
        {"width":  640, "height":  360,  "frame_rate":25}],
    "q-min":  0.95,
  },
  "outputs":  [
    {"label": "rendition1", "url": "s3://output-bucket/rendition1/file.m4f",
        "format": "m4f", "dynamic_profile_rendition": 1,"notifications":
        "http://bolt/notification-receiver/134f1rdft3de23t/rendition1" },
    {"label": "rendition2", "url": "s3://output-bucket/rendition2/file.m4f",
        "format": "m4f", "dynamic_profile_rendition ": 2, "notifications":
        "http://bolt/notification-receiver/134f1rdft3de23t/rendition2" },
    {"label": "rendition3", "url": "s3://output-bucket/rendition3/file.m4f",
        "format": "m4f", "dynamic_profile_rendition ": 3, "notifications":
        "http://bolt/notification-receiver/134f1rdft3de23t/rendition3" },
    {"label": "rendition4", "url": "s3://output-bucket/rendition4/file.m4f",
        "format": "m4f", "dynamic_profile_rendition ": 4, "notifications":
        "http://bolt/notification-receiver/134f1rdft3de23t/rendition4" },
    {"label": "rendition5", "url": "s3://output-bucket/rendition5/file.m4f",
        "format": "m4f", "dynamic_profile_rendition ": 5, "notifications":
        "http://bolt/notification-receiver/134f1rdft3de23t/rendition5" },
    {"label": "rendition6", "url": "s3://output-bucket/rendition6/file.m4f",
        "format": "m4f", "dynamic_profile_rendition ": 6, "notifications":
        "http://bolt/notification-receiver/134f1rdft3de23t/rendition6" },
    {"label": "rendition7", "url": "s3://output-bucket/rendition7/file.m4f",
        "format": "m4f", "dynamic_profile_rendition ": 7, "notifications":
        "http://bolt/notification-receiver/134f1rdft3de23t/rendition7" }
  ] ,
  "report_profile_statistics": true
  "notifications": "http://bolt/notification-receiver/134f1rdft3de23t/job"
}
```

The above example illustrates how a profile generation request 255 can be triggered (e.g., setting the Boolean "generate_dynamic_profile" as "true"), and how various restraints may be included in the profile generation request 255. In particular, the example uses the object "dynamic_profile_options" to restrict the profile generation operation 230 to produce between two and seven renditions using any of the three given resolutions (1280×720, 960×540, and 640×360), with a target quality value (SSIM, in this case) of 0.95.

The restrictions on the profile generation operation 230 included in the profile generation request 255 can vary, depending on desired functionality. In the case of the Zencoder™, various parameters defining these restrictions are described in the Table 1 below:

TABLE 1

| Example Profile Generation Parameters | | |
|---|---|---|
| Name | Type | Description |
| "min_renditions" | integer number | Minimum number of renditions to generate. Default = 1. |
| "max_renditions" | integer number | Maximum number of renditions to generate. Default = 6. |
| "min_granularity" | floating point number | Minimum profile bitrate granularity [%]. Default = 25%. |
| "max_granularity" | floating point number | Maximum profile bitrate granularity [%]. Default = 100%. |
| "min_bitrate" | floating point number | Minimum bitrate [kbps] that can be used. Default = 200 Kbps. |
| "max_bitrate" | floating point number | Maximum bitrate [kbps] that can be used. Default = 15 Mbps. |
| "max_min_bitrate" | floating point number | Maximum bitrate [kbps] that can be used for first rendition. Default = 400 Kbps. |

TABLE 1-continued

Example Profile Generation Parameters

| Name | Type | Description |
|---|---|---|
| "max_frame_rate" | floating point number | Maximum framerate that can be used across all configurations. Default = 30. |
| "aspect_mode" | string | Prescribes method of handling of input/output video aspect ratios. preserve: [default] -- preserve the aspect ratio of the original file, so if you submit widescreen content and ask for standard resolution, the output file will fit keep the widescreen aspect ratio, and will fit within the output size. stretch: the output video will exactly match the requested width and height, even if it distorts the image. crop: "zoom in" to the video to match the output size, by cropping pixels from the top/bottom or left/right. pad: letterbox the video to match the output frame size exactly. |
| "video_codec" | string | One of the following strings are allowed: "h264", "h265", "vp9". Default = "h264". |
| "keyframe_rate" | floating point number | Keyframe rate. Default = 0.5 fps. |
| "bitrate_cap_to_bitrate_ratio" | floating point number | Ratio of maximum bitrate to average bitrate to be used for VBR encoding. Default = 1.3. |
| "buffer_size_to_bitrate_ratio" | floating point number | Ratio of decoder buffersize to average bitrate to be used for VBR encoding. Default = 2.0. |
| "speed" | integer number | Encoding speed parameter. Default = 3. |
| "one_pass" | boolean | Force 1-pass encoding. Default = false. |
| "tuning" | string | Codec-specific tuning option. |
| "video_configurations" | array | An array of structures describing resolutions, framerates and associated codec parameters that can be used |
| "select_distinct_configurations" | boolean | Forces each rendition to use different video configurations (as specified by list of video_configurations). Default = false. |
| "min_ssim" | floating point number | Lowest allowed SSIM for each rendition. Default = 0.94. |
| "max_ssim" | floating point number | Highest allowed SSIM for each rendition. Default = 0.99. |
| "target_pw_ssim" | floating point number | Target average perceptually-weighted SSIM for entire profile. |
| "usage" | hash | An array of 4 numbers representing anticipated distribution of usage of content between the following devices: Connected TVs, PCs, Tablets, and Smartphones. If omitted, uniform usage distribution is assumed. |
| "importance" | hash | An array of 4 numbers representing importance of reaching the following devices: Connected TVs, PCs, Tablets, and Smartphones. If omitted, uniform importance is assumed. |
| "network_pdfs" | hash | An array of 4 histograms representing anticipated PDFs of networks connecting to the following devices: Connected TVs, PCs, Tablets, and Smartphones. Each histogram is an array of pairs of numbers, representing center of histogram bin and associated weight. If omitted, world-average histograms for each category of connected devices will be used. |
| "optimization_target" | string | Profile optimization metric/target. Valid choices of this parameter are: "storage" - minimizes storage usage "resolution" - maximizes resolution (total number of pixels) represented by the profile "pixels-per-bit" - maximize # of pixels per bit encoded/stored |

TABLE 1-continued

| Example Profile Generation Parameters | | |
|---|---|---|
| Name | Type | Description |
| | | "ssim" - maximize worst-case encoding quality/rendition |
| | | "pq" - maximizes average perceptually weighted SSIM across all categories of devices (requires network statistics) |
| | | "bandwidth" - minimizes average network bandwidth usage (requires network statistics, and -P quality target). |
| "start_clip" | time | Create a subclip of the original video, starting at a particular time. This can either be a timecode with a format of HH:MM:SS.S, or a decimal expressing the number of seconds to start at. |
| "clip_length" | time | Create a subclip of a particular length. This can either be a duration with a format of HH:MM:SS.S, or a decimal expressing the length of the clip in seconds. |

In the example parameters above, the "video_configuration" parameter is an array of structures that may include the events in Table 2 below:

TABLE 2

| Example Video_Configuration Options | | |
|---|---|---|
| Name | Type | Description |
| "width" | integer number | Video frame width [pixels] |
| "height" | integer number | Video frame height [pixels] |
| "sample_aspect_ratio" | integer:integer pair | Sample aspect ratio (e.g. 1:1, 4:3) |
| "frame_rate" | floating point number | Video framerate [fps] |
| "video_codec_profile" | string | video codec profile |
| "video_codec_level" | string | video codec level |
| "video_reference_frames" | integer number | Constraint on number of reference frames. Default = 4. |
| "video_bframes" | integer number | Constraint on number of B frames. Default = 3. |

Finally, in the example JSON file above, the "outputs" array defines a maximum number of renditions allowed by the profile generation operation 230, including all the usual requisites and additionally indicating a rendition number in the final profile. In the case where the profile generation operation 230 produces fewer than the seven renditions indicated in the JSON file, for example five, only renditions with "dynamic_profile_rendition" variable set to 1-5 will be generated.

In some embodiments, the transcoding response 285 generated by the transcoding operation 240 after transcoding the source content may comprise additional error codes and components needed to communicate profile-related statistics. In some embodiments, this may be included as a JSON notification block. For example, the following JSON block shows how additional parameters (quality-rate models) can be signaled in the notification block:

```
{
  "video_quality_rate_models":
  [
    {
      "width": 1280, "height": 720, "fps":50, "video_codec_profile": "high",
      "ssim_rate_model": {"alpha":0.9,"beta":1.3},
      "pw_ssim_rate_models": [{{"alpha":0.9, "beta":1.3}}, {{"alpha":0.9, "beta":1.3}},
            {{"alpha":0.9,"beta":1.3}},{{"alpha":0.9,"beta":1.3}}]
    },
    {
      "width": 1280, "height": 720, "fps":25, "video_codec_profile": "main",
      "ssim_rate_model": {"alpha":0.9,"beta":1.3},
      "pw_ssim_rate_models": [{{"alpha":0.9,"beta":1.3}}, {{"alpha":0.9, "beta":1.3}},
            {{"alpha":0.9,"beta":1.3}},{{"alpha":0.9,"beta":1.3}}]
    },
    {
      "width": 960, "height": 540, "fps":25, "video_codec_profile": "main",
      "width": 1280, "height": 720, "fps":25, "video_codec_profile": "main",
      "ssim_rate_model": {"alpha":0.9, "beta":1.3},
```

-continued

```
        "pw_ssim_rate_models": [{{"alpha":0.9, "beta":1.3}}, {{"alpha":0.9,"beta":1.3}},
            {{"alpha":0.9,"beta":1.3}},{{"alpha":0.9, "beta":1.3}}]
    },
    {
        "width": 640, "height": 360, "fps":25, "video_codec_profile": "main",
        "width": 1280, "height": 720, "fps":25, "video_codec_profile": "main",
        "ssim_rate_model": {"alpha":0.9,"beta":1.3},
        "pw_ssim_rate_models": [{{"alpha":0.9,"beta":1.3}}, {{"alpha":0.9,"beta":1.3}},
            {{"alpha":0.9,"beta":1.3}},{{"alpha":0.9,"beta":1.3}}]
    },
],
}
```

In this example, the various available elements within the JSON block are described in Table 3 below:

TABLE 3

Video_Quality_Rate_Models Elements

| Name | Type | Description |
|------|------|-------------|
| "width" | integer number | Video frame width [pixels] |
| "height" | integer number | Video frame height [pixels] |
| "frame_rate" | floating point number | Video framerate [fps] |
| "video_codec_profile" | string | video codec profile |
| "video_reference_frames" | integer number | Constraint on number of reference frames. Default = 4. |
| "video_bframes" | integer number | Constraint on number of B frames. Default = 3. |
| "ssim_rate_model" | Object | A structure containing "alpha", "beta" floats, describing model parameters. |
| "pw_ssim_rate_model" | Array | An array of 4 structures containing "alpha", "beta" floats, describing quality-rate model parameters corresponding to different target devices |

According to various embodiments, two types of techniques may be utilized when generating encoding profiles: (1) finding a minimum sufficient bit rate for a given content, resolution and a quality target, or (2) producing an optimal encoding ladder given a set of constraints (e.g. a set of resolutions that can be used, minimum/maximum bitrates, etc.) and an optimization criterion Technique (1) may be invoked in situations when the task is to produce one or multiple encodings with exactly prescribed resolutions and framerates, and when the number of such encodings is also fixed (as can be accomplished by setting min_renditions=max_renditions=number of video configurations, and select_distinct_configurations=true). In such situations, it is only the bitrate that needs to be assigned, and that is what Technique (1) does. Technique (2) may be invoked in situations when the task is to produce one or multiple renditions when not only bitrates, but also resolutions, framerates, and other codec-related parameters, as well as number of encodings can be chosen dynamically. Hence, Technique (2) is more general, and it may use Technique (1) as an internal tool. These two techniques are described in more detail below.

Finding Minimum Sufficient Bit Rate For A Given Content, Resolution, and Quality Target According to some embodiments, techniques for finding minimum sufficient bit rate for a given content, resolution and quality target can be described as follows: given the inputs of source content, target resolution (and optionally target frame rate), and video codec (which may include other constraints), find the lowest target bit rate at which an encoded video will have a given target quality value.

In simplest mathematical interpretation, assuming a quality metric Q, a quality target Q*, and a quality-rate function Q(R) achievable by the codec for a given input sequence, the problem is basically this:

$$R^* = \min_R \{Q(R) \geq Q^*\}, \tag{1}$$

where R* denotes the target bit rate to find.

In a case when Q(R) is a monotonic function, target bit rate R* becomes direct solution of equation:

$$Q(R^*) = Q^*. \tag{2}$$

In some embodiments, SSIM can be used as quality metric. SSIM is effectively an estimate of codec noise energy, scaled and mapped to [0,1] range, and where 1 implies ideal quality (0 noise), and 0 implies poorest quality. As discussed in further detail below, a variant of SSIM, incorporating resolution scaling and perceptual filtering before SSIM computation can also be used—to understand quality differences across different reproduction devices. That said, other embodiments may utilize other quality metrics (Peak Signal-To-Noise Ratio (PSNR), MOS, PQR, Video Multimethod Assessment Fusion (VMAF), etc.), depending on desired functionality or user/operator preferences. Moreover, certain variations in temporal aggregation of such metrics may also be employed and customized to operator's preference. For example, the combined quality metric for a sequence can be (a) an average of frame-level estimates, or (b) worst case frame-level value, or (c) worst case among moving average values taken within some finite (e.g. 300 ms) observation window, or (d) a value ensuring that percentage of time the quality drops below said value is limited by a given constant (e.g. 1%), etc.

A target quality value can also vary, depending on operator preferences. For example, videos encoded at SSIM≥0.95 may be assumed to be of good enough quality, while at lower SSIM levels there is a risk that users may notice artifacts. Put generically, for purposes of this description, we assume that we are given a certain quality target $Q^*=Q^*_{SSIM}$, and the objective of the algorithm is to find a rate R* matching it.

In order to characterize behavior of quality-rate Q(R) function, use a combination of the following can be used:

a parametric model of quality-rate functions observed for different types of video sequences is defined, aiming to capture observed variability of shapes by few model parameters;

one or more probe encodings may be executed to see where each (rate, quality) point will land, and the results may be used to fit a model to observed behavior for a particular video sequence.

The model may be defined as part of the design process, whereas the probe encodings can be executed in run time when the model is fitted to each particular sequence.

As described in further detail below, probe encodings are encodings a portion of the source content at certain bit rates to help determine a final bit rate with which to encode the source content to help ensure it meets the target quality value (within a threshold amount of variation). Accordingly, these probe encodings can be much faster than the final encodings of the entire source content, and may, in fact, represent just a part of a complete encoding process. As such, there may be no need to generate actual bit-stream at probing stages. What is desired from each probe, is an estimate of a location of a (rate, quality) point that can be reached by running a complete encoding process.

Based on locations of probe points, Q(R) model can be fitted to the obtained probe points and used to find the final bit rate to meet target quality value. An example of this is illustrated in FIG. 3.

Figure 3:
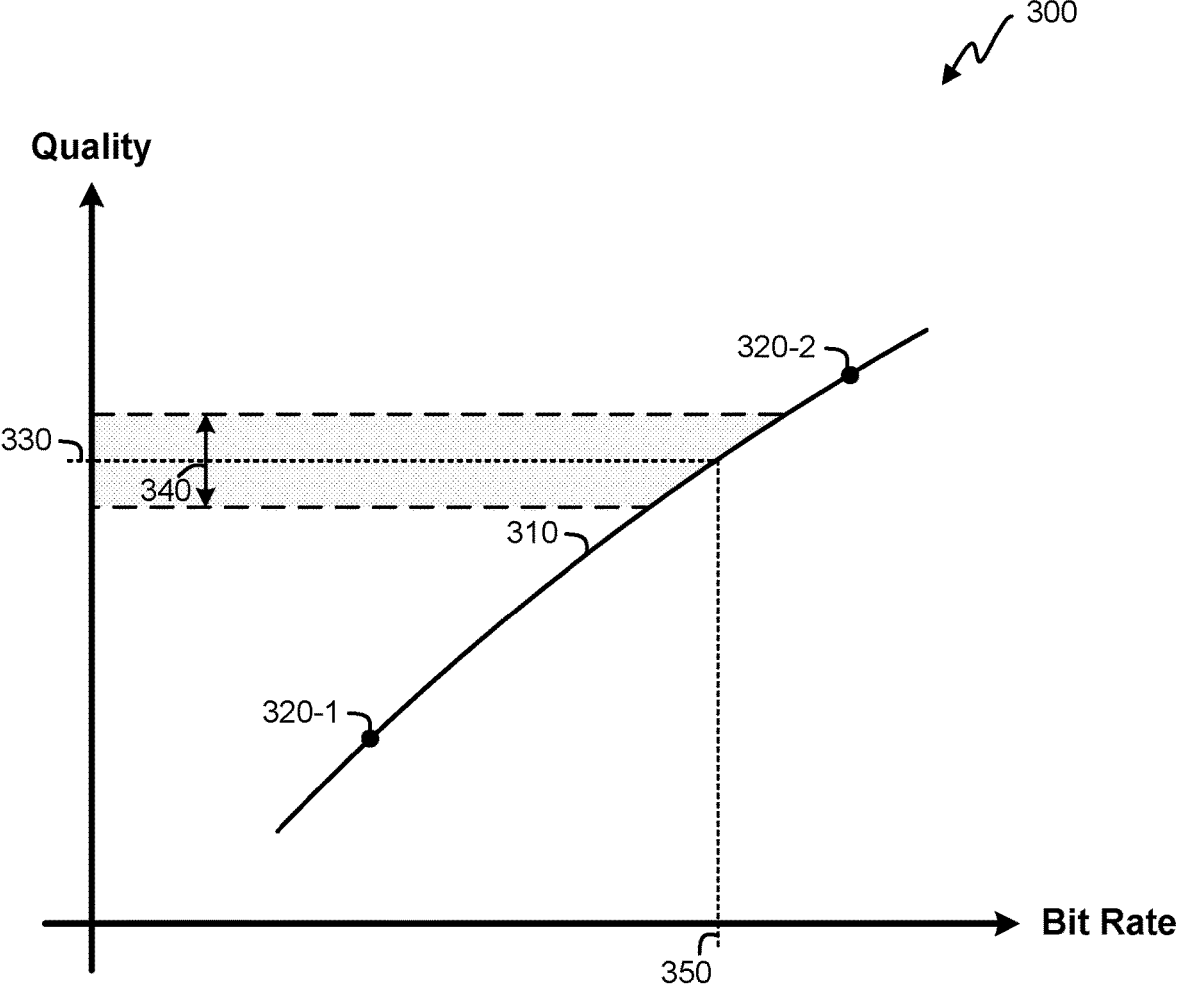
FIG. 3 is a diagram, showing quality as a function of bit rate, according to an example Q(R) model.

FIG. 3 is a diagram 300, showing quality as a function of bit rate according to a particular Q(R) model 310. Before the Q(R) model 310 is plotted, however, probe encodings are performed to generate (rate, quality) points 320. A first (rate, quality) point 320-1 may be the result of a first probe encoding in which a bit rate is selected (using techniques such as those described below), a portion of the source content is encoded using the selected bit rate, and the quality of the encoded portion of the source content is determined.

Because the first probe encoding resulted in a quality lower than a target quality value 330 (and outside a threshold variation 340 of the target quality value 330), a second probe encoding may be performed having a higher bit rate. This second probe encoding results in a second (rate, quality) point 320-2. (It can be noted that, in some embodiments, the target quality value 330 may represent a minimum quality value. In such cases, the threshold variation 340 may only represent values greater than the target quality value 330. A person of ordinary skill in the art will recognize other variations on such thresholds.)

Because the second probe encoding resulted in a quality higher than a target quality value 330 (and outside the threshold variation 340 of the target quality value 330) another bit rate for encoding may be estimated. Here, however, the Q(R) model 310 may be used. That is, using the (rate, quality) points 320 generated from the first and second probe encodings, the Q(R) model 310 can then be fitted to these (rate, quality) points 320. This allows a model-based rate estimate 350 to be determined using the Q(R) model 310 and the target quality value 330. Another probe encoding may be performed to ensure that the resulting encoded content falls within the threshold variation 340 of the target quality value 330.

This process may be iterative, refining the model-based rate estimate 350 estimate in cases where the model-based rate estimate 350 does not fall within the threshold variation 340 of the target quality value 330. However, minimizing the number of probe encodings helps ensure efficiency in the encoding process. Each such probe contributes to the total encoding time, and consequently delay and cost of the service.

The Q(R) model 310 may be considered as an interpolation or extrapolation based on probe points. Various models and/or model types may be used, depending on desired functionality.

In one embodiment using the x264 encoder and SSIM metric, the following parametric model is used:

$$Q_{SSIM}(R) \sim \alpha\left(\frac{R}{1+R}\right)^{\beta}, \tag{3}$$

where $\alpha$ and $\beta$ are model parameters, controlling the gain and shape of the quality-rate relation. More generally, other functional models may also be employed, but the use of models with only one or two parameters is preferred as it allows computation of such parameters based on just one or two encode points.

Figure 4:
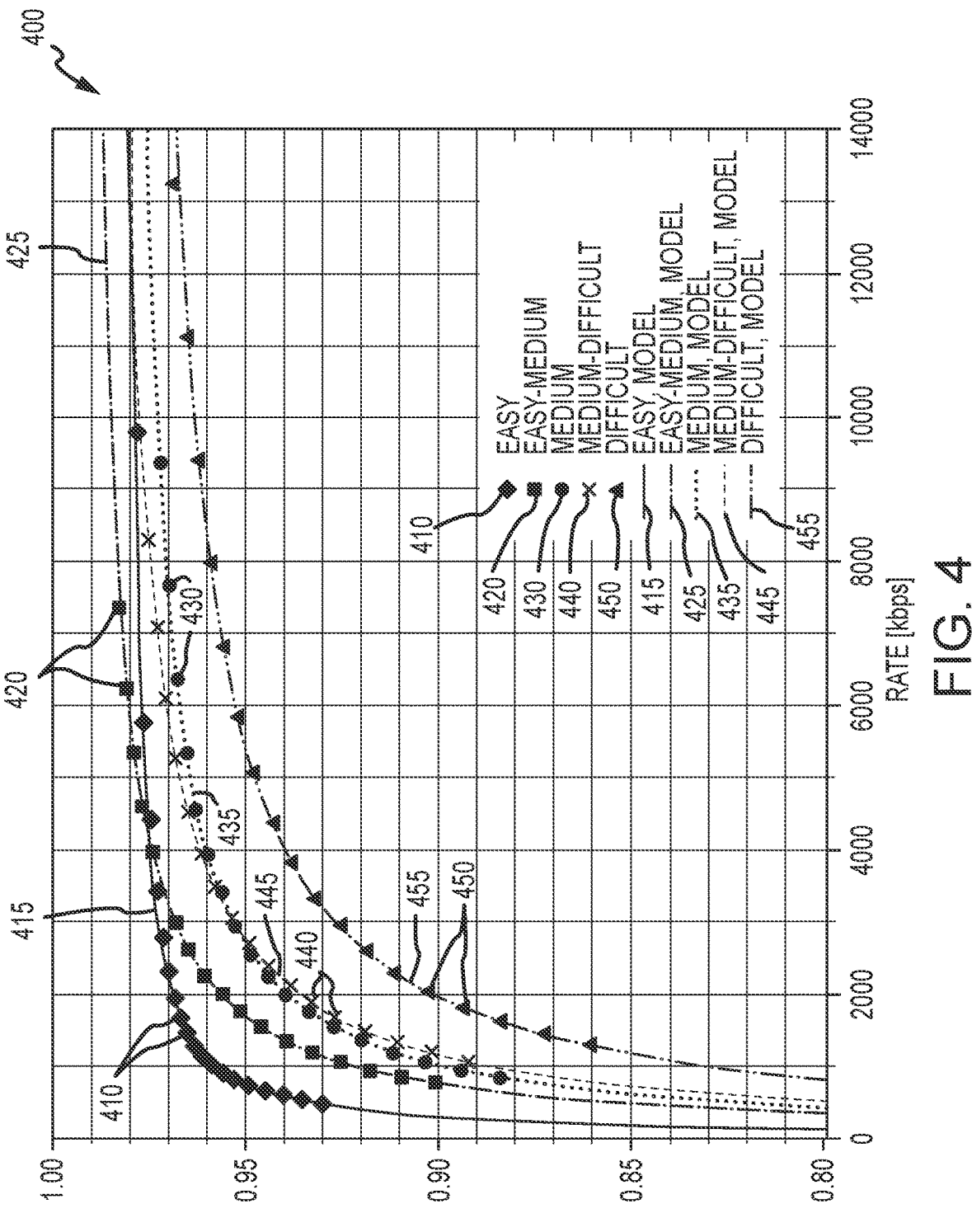
FIG. 4 is a graph in which a $Q_{SSIM}(R)$ model is used to fit characteristics of five different sequences of different degrees of coding complexity.

FIG. 4 is a graph 400 in which the $Q_{SSIM}(R)$ model above is used to fit characteristics of 5 different sequences of different degrees of coding complexity. Specifically, an "Easy model" 415 was created to fit experimental data points of coding having "Easy" complexity 410, an "Easy-medium model" 425 was created to fit experimental data points of coding having "Easy-medium" complexity 420, a "Medium model" 435 was created to fit experimental data points of coding having "Medium" complexity 430, a "Medium-difficult model" 445 was created to fit experimental data points of coding having "Medium-difficult" complexity 440, and a "Difficult model" 455 was created to fit experimental data points of coding having "Difficult" complexity 450. (To avoid clutter, only a few points of the experimental data have been labeled in FIG. 4.) It can be observed that in all cases the $Q_{SSIM}(R)$ model fits experimental data remarkably well.

Experimental results show that the value of parameter a is changing very slightly for different sequences. In some results, an observed a range was from 0.979 to 0.992, and with median point being $\alpha_0=0.9843681086$. Hence, the $Q_{SSIM}(R)$ model above is primarily controlled by the shape parameter $\beta$.

Given the values of two (rate, quality) points: $(R_1, Q_1)$ and $(R_2, Q_2)$, the model parameters $\alpha$ and $\beta$ can be computed as follows:

$$\alpha = q1 e^{-\frac{(\ln(R_1)-\ln(1+R_1))(\ln(Q_1)-\ln(Q_2))}{\ln(R_1)-\ln(R_2)+\ln(1+R_2)-\ln(1+R_1)}}, \quad (4)$$

$$\beta = \frac{\ln(Q_1) - \ln(Q_2)}{\ln(R_1) - \ln(R_2) + \ln(1 + R_2) - \ln(1 + R_1)}. \quad (5)$$

If only one point is known, and the value of a is guessed to be $\alpha = \alpha_0$, then the second parameter can be computed as follows:

$$\beta_0 = \frac{\ln(Q_1) - \ln(\alpha_0)}{\ln(R_1) - \ln(1 + R_1)}. \quad (6)$$

This version of the SSIM-rate model (3), where only parameter $\beta = \beta_0$ is computed, and parameter $\alpha = \alpha_0$ is fixed, will be referred to as one-parameter model.

Another relationship that may be important to understand and model is the relationship between codec-specific quality control parameter and SSIM or other final quality metric employed by the system. In the case of x264 and x265 video codecs, the corresponding quality control parameter is called the Constant Rate Factor (CRF).

A model that has been found to work reasonably well for SSIM-CRF quality curves is the following:

$$Q_{SSIM}(C) \sim 1 - \rho C^{\sigma}, \quad (7)$$

where C denotes the value of the CRF parameter, and $\rho$ and $\sigma$ are model parameters, controlling the spread and the shape and speed of the decay of this model. More generally, other functional models may also be employed, but the use of models with only one or two parameters is preferred as it allows computation of such parameters based on just one or two encode points.

Figure 5:
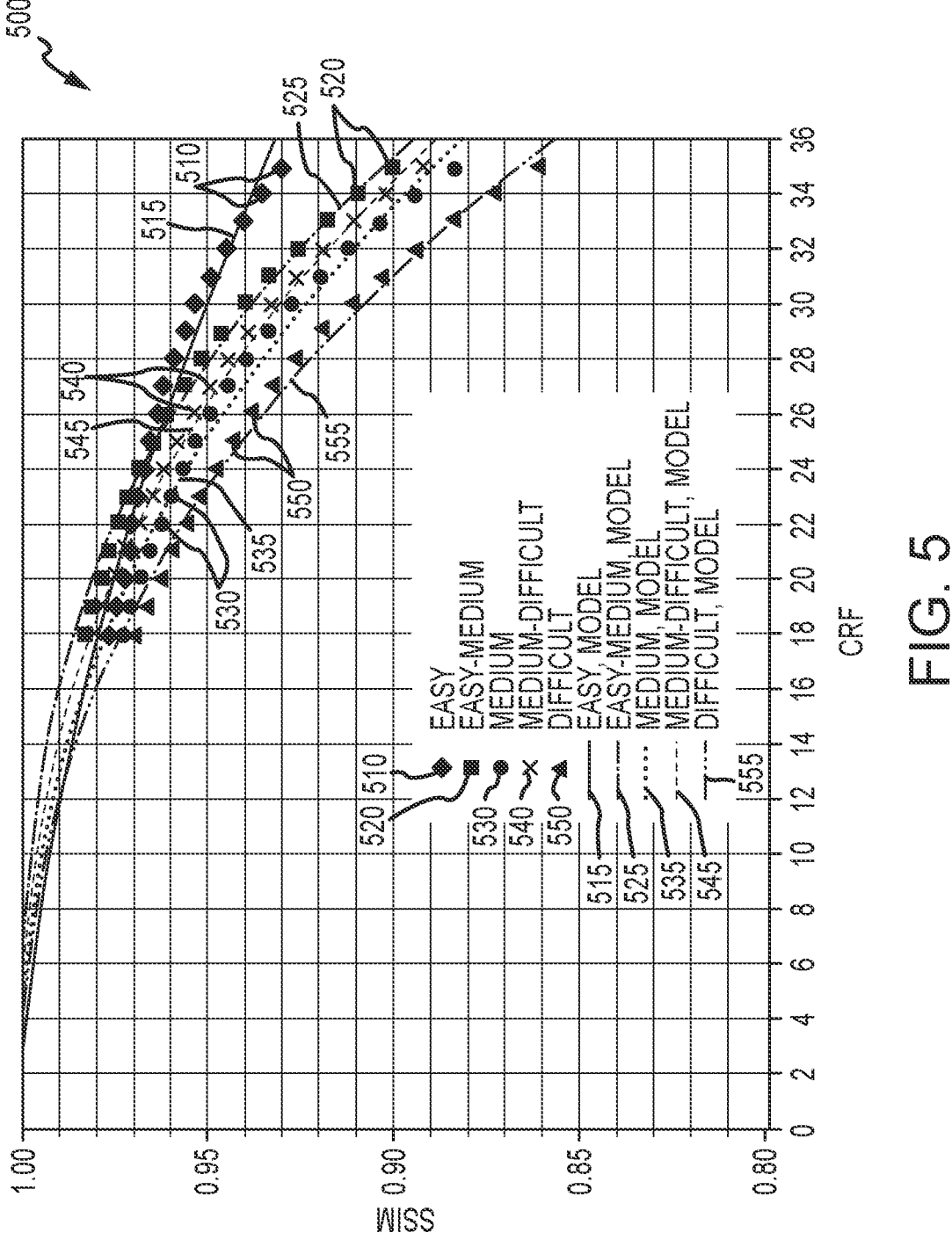
FIG. 5 is an example graph plotting experimental data and models of Structural Similarity Index Metric (SSIM) as a function of Constant Rate Factor (CRF).

An example fit of experimental data to this model is shown in FIG. 5, which is a graph 500 plotting experimental data and models of SSIM as a function of CRF. Specifically, an "Easy model" 515 was created to fit experimental data points of coding having "Easy" complexity 510, an "Easy-medium model" 525 was created to fit experimental data points of coding having "Easy-medium" complexity 520, a "Medium model" 535 was created to fit experimental data points of coding having "Medium" complexity 530, a "Medium-difficult model" 545 was created to fit experimental data points of coding having "Medium-difficult" complexity 540, and a "Difficult model" 555 was created to fit experimental data points of coding having "Difficult" complexity 550. (To avoid clutter, only a few points of the experimental data have been labeled in FIG. 5.)

Given the values of two (CRF, quality) points: $(C_1, Q_1)$ and $(C_2, Q_2)$, the model parameters $\rho$ and $\sigma$ can be computed as follows:

$$\rho = (1 - Q_2)C_2^{\frac{\ln(1-Q_2)-\ln(1-Q_1)}{\ln(C_2)-\ln(C_1)}}, \quad (8)$$

$$\sigma = \frac{\ln(1 - Q_2) - \ln(1 - Q_1)}{\ln(C_2) - \ln(C_1)}. \quad (9)$$

If only 1 point is known, and the value of $\sigma$ is guessed to be $\sigma = \sigma_0$, then the parameter $\rho$ becomes:

$$\rho_0 = (1 - Q_1)C_1^{-\sigma_0}. \quad (10)$$

This version of the SSIM-CRF model (7), where only parameter $\rho = \rho_0$ is computed, while parameter $\sigma = \sigma_0$ is fixed will be referred to as one-parameter model. The suitable fixed value of parameter $\sigma_0$ can be established, e.g. by finding a mean of parameters $\sigma$ computed over a set of test sequences with different complexities. Based on sequence set used earlier, it follows that such average value is about $\sigma_0 \approx 2.2$.

With regard to determining a rate for a first probe encoding, this can be done using any number of approaches, depending on desired functionality. To minimize the number of probe encodings, it is desirable to use a best educated guess about the rate (or other codec parameters) needed to reach a target quality value (e.g., target SSIM). Additionally or alternatively, a codec-specific quality value (such as CRF in the case of x264) may be set in a probe encoding in order to reach the target quality value.

Figure 6:
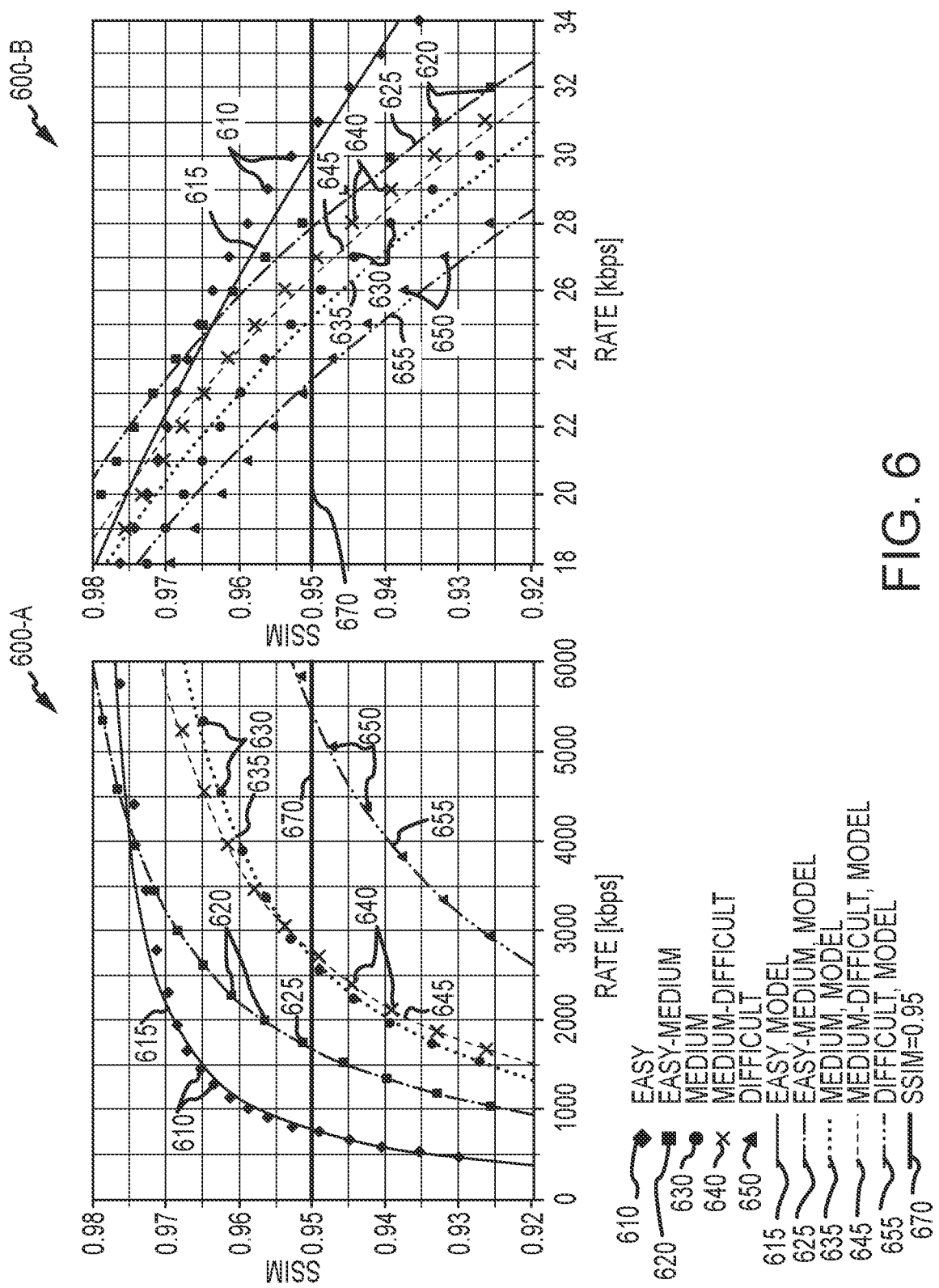
FIG. 6 is shows example graphs in which experimental data points plot a quality value (SSIM) as a function of bit rate and CRF.

FIG. 6 shows graphs 600-A and 600-B in which experimental data points and models plot a quality value (SSIM) as a function of bit rate and CRF, respectively. Similar to the graphs in FIGS. 4 and 6, the graphs 600-A and 600-B show an "Easy model" 615 and corresponding experimental data points of coding having "Easy" complexity 610, an "Easy-medium model" 625 and corresponding experimental data points of coding having "Easy-medium" complexity 620, a "Medium model" 635 and corresponding experimental data points of coding having "Medium" complexity 630, a "Medium-difficult model" 645 and corresponding experimental data points of coding having "Medium-difficult" complexity 640, and a "Difficult model" 655 with corresponding experimental data points of coding having "Difficult" complexity 650. (Again, to avoid clutter, only a few points of the experimental data have been labeled in FIG. 6.) Here, the target quality value 670 is SSIM=0.95

As evident from FIG. 6, if a target bit rate is used, the results may vary greatly in SSIM range. E.g., by using rate=300 Kbps, for "Easy" sequences (720p sequences, in this case) it will produce an SSIM of approximately 0.973, while for difficult ones it will produce an SSIM of approximately 0.926. This results in an almost 0.05 SSIM spread. On the other hand, if a target CRF is used, there is much less of a spread. For example, by setting CRF to 26, the easiest sequence results in an SSIM of approximately 0.963, and the most difficult sequence results in an SSIM of approximately 0.938. This is an SSIM spread of 0.025, which is roughly half the spread of using a target bit rate. Accordingly, in some embodiments, a codec-specific quality value may be used for probe encodings.

More specifically, for encodings utilizing an x264 codec, a default target rate or CRF value may be used for a first probe encoding. In some embodiments, for example, given resolution of 720p and 0.95 SSIIM rate target, a default rate of 3000 kbps or default CRF value of 26 may be used.

More generally, factors such as resolution, framerate, GOP-length, codec type, codec profile and codec speed/preset parameters may also be used to determine placement of initial probe encoding point by specifying target rate or CRF values. Such default choices can be either pre-computed and stored for some combinations of such parameters, or computed dynamically using properly chosen functions/models.

After the first probe encoding is performed (and regardless of whether it was based on a codec-specific quality value or a target bit rate, for example), the resulting quality value of the first probe encoding can be determined. In some embodiments the quality value obtained after first probe encoding can be checked, and if this value is sufficiently close to the target quality value (e.g., within a threshold quality variation), no more probe encodings are performed, and target rate is determined using single-parameter model fit to cross the first probe point In some other embodiments, the second probe encoding is performed, and the target rate is determined using two-parameter model fit to cross both probe points.

The value for the threshold quality variation can vary, defining a tradeoff between complexity (i.e. number of probes executed) and the accuracy of matching the quality target. In some embodiments, a minimum SSIM variation threshold may be 0.005 SSIM. Other embodiments may have larger or smaller thresholds, or don't use threshold comparison, and proceed directly to the second probe.

In the case of an SSIM target quality value, when such close proximity match is detected, the target rate can be determined by (1) drawing the single-parameter model $Q_{SSIM}(R)$ through the first point, and then (2) solving $Q_{SSIM}(R^*)=Q^*_{SSIM}$ equation. This results in:

$$R^* = \left(\frac{Q^*_{SSIM}}{\alpha_0}\right)^{\frac{1}{\beta_0}}\left(1 - \left(\frac{Q^*_{SSIM}}{\alpha_0}\right)^{\frac{1}{\beta_0}}\right)^{-1}, \quad (11)$$

where $$\alpha_0 = 0.9843681086, \quad (12)$$

$$\beta_0 = \frac{\ln(Q_1) - \ln(\alpha_0)}{\ln(R_1) - \ln(1 + R_1)}, \quad (13)$$

$(R_1, Q_1)$ are coordinates of the first probe, and $Q^*_{SSIM}=0.95$.

Finding the target bit rate or codec-specific quality value for the second probe encoding can be done by using several considerations or techniques, including fitting a single parameter model to the quality value of the first probe encoding and then predicting new target bitrate or CRF needed to match the quality target.

For example, in the case of using a CRF value for probe encodings directed toward reaching a target SSIM value, the new CRF value is found by drawing a SSIM-CRF model through the first probe point. The CRF model parameter $\rho$ in this case can be computed as:

$$\rho_0 = (1 - Q_1)C_1^{-\sigma_0}. \quad (14)$$

where $\sigma_0 \approx 2.2$.

Figure 7:
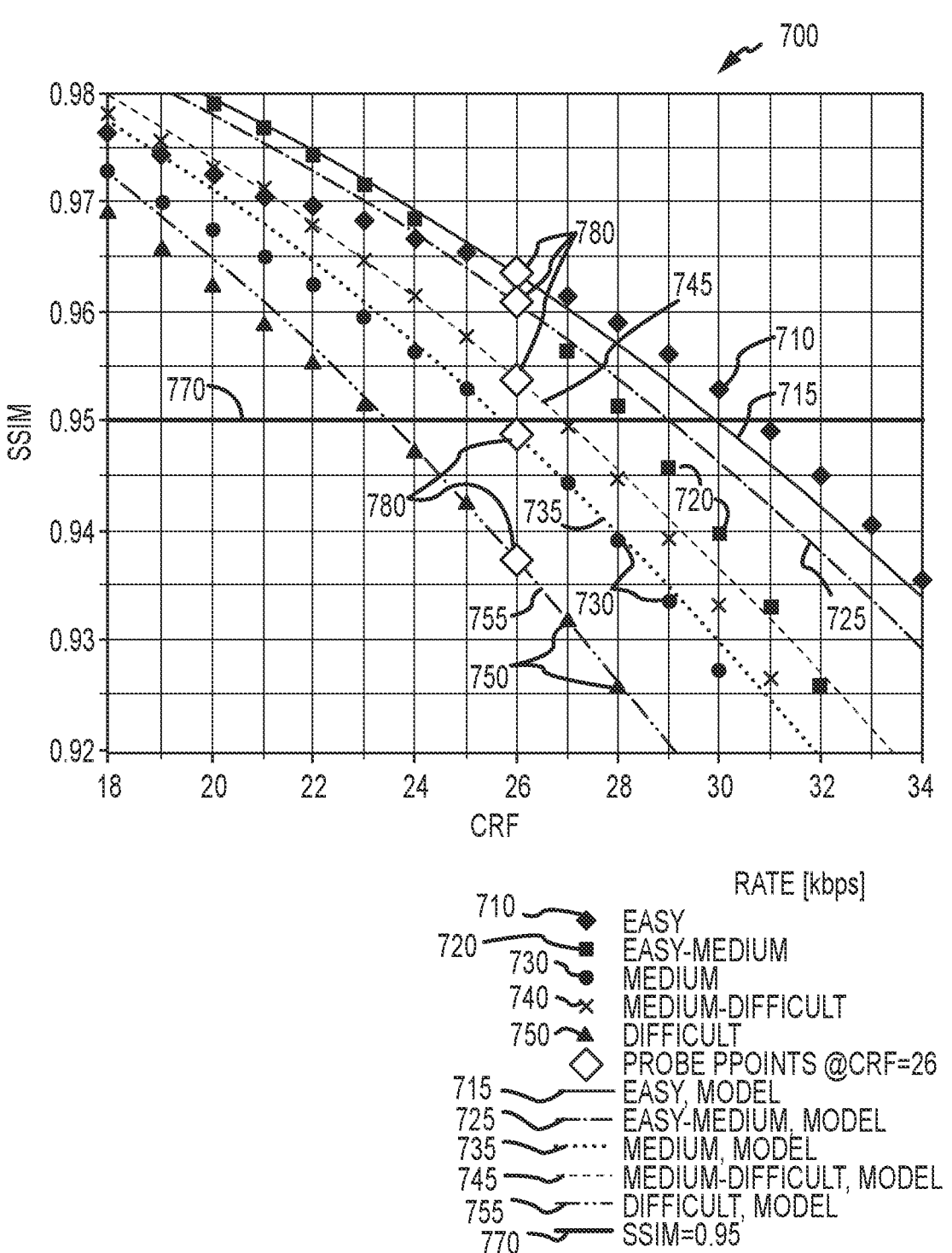
FIG. 7 is an illustration of an example graph in which the values of experimental data points and model values of CRF are shown as a function of SSIM.

FIG. 7 is an illustration of a graph 700 in which the values of experimental data points and model values of CRF are shown as a function of SSIM. Similar to earlier graphs, the graph 700 shows an "Easy model" 715 and corresponding experimental data points of coding having "Easy" complexity 710, an "Easy-medium model" 725 and corresponding experimental data points of coding having "Easy-medium" complexity 720, a "Medium model" 735 and corresponding experimental data points of coding having "Medium" complexity 730, a "Medium-difficult model" 745 and corresponding experimental data points of coding having "Medium-difficult" complexity 740, and a "Difficult model" 755 with corresponding experimental data points of coding having "Difficult" complexity 750. (Again, to avoid clutter, only a few points of the experimental data have been labeled in FIG. 7.) A target quality value 770 is also shown.

Here, a first encoding performed with a CRF value of 26 results in "probe points" 780 of various SSIM values, depending on the type of content encoded. Depending on the value of the "probe point" (the quality value of the first probe encoding), a model can be chosen, and a second probe encoding can be performed (with a CRF value or bit rate chosen based on where the selected model intersects with the target quality value; in this case, SSIM=0.95). For example, where a first probe encoding at CRF=26 results in an SSIM value of approximately 0.937, the "Difficult" model can be chosen, and a CRF value of 23.486 can be selected for the second probe encoding, based on where the "Difficult" model intersects with the target SSIM value of 0.95.

Once first and second probe encodings are computed, a resulting pair of (rate, quality) values ($(R_1, Q_1)$ and $(R_2, Q_2)$ respectively) can be determined, each having the bit rate and corresponding quality value of the respective probe encoding. A quality-rate model can then be fitted to these points, and used to compute rate hitting target quality value. An example of such operation is provided in FIG. 8.

Figure 8:
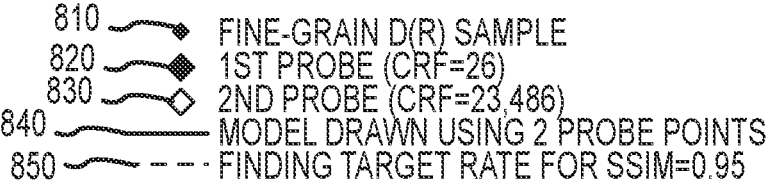
FIG. 8 is an example graph that plots a model fitted to the (rate, quality) value of the first probe encoding and the (rate, quality) value of the second probe encoding.

FIG. 8 is a graph 800 plotting a model 840 fitted to the (rate, quality) value of the first probe encoding 820 and the (rate, quality) value of the second probe encoding 830. This model 840 provides an accurate relationship between the quality value (SSIM) and the bit rate enabling the bit rate corresponding to the target quality value (SSIM=0.95) to be determined.

The graph 800 illustrated in FIG. 8 illustrates experimental results in which a first probe encoding was performed with CRF=26, the "Difficult" model was selected, and a second probe encoding was performed with CRF=23.486. Other experimental data points 810 and other bit rates illustrate how accurate the model 840 is relative to the experimental data 810, across various bit rates.

The final target rate value, computed using the inverse of our rate-quality model is $$R^* = \left(\frac{Q^*_{SSIM}}{\alpha}\right)^{\frac{1}{\beta}}\left(1 - \left(\frac{Q^*_{SSIM}}{\alpha}\right)^{\frac{1}{\beta}}\right)^{-1}, \quad (15)$$

where $Q^*_{SSIM}=0.95$ and parameters $\alpha$ and $\beta$ are identified by drawing $Q_{SSIM}(R)$ model curve through given two probe points (see Section 2.3.4). The final target rate value is shown at label 850.

In this manner, an accurate model of the relationship between bit rate and a quality value can be determined, and a minimum sufficient bitrate for achieving the specified quality value can be obtained.

Figure 9:
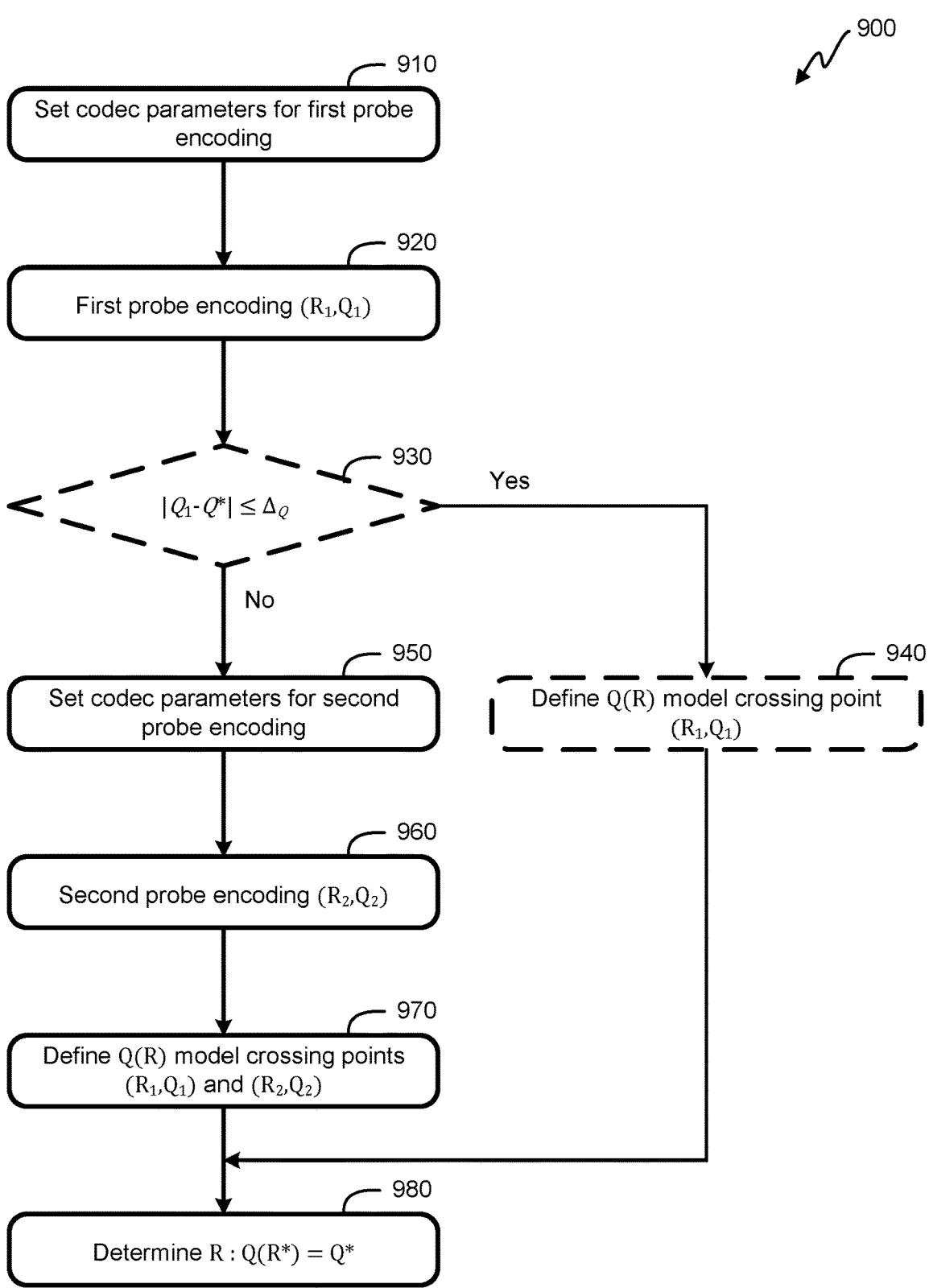
FIG. 9 is a flow chart illustrating a method of finding bit rates for an encoding as discussed above, according to an embodiment.

FIG. 9 is a flow chart 900 illustrating a method of finding bit rates for an encoding as discussed above, according to an embodiment. It will be understood that the steps provided in the flow chart 900 are provided as an example. Alternative embodiments may add, omit, combine, separate, and otherwise alter the functions as shown. The functions of one or more of the blocks illustrated in FIG. 9 may be performed, for example, by software and/or hardware means of a computer system, such as the computer system illustrated in FIG. 16 described in more detail below.

The variables provided in FIG. 9 are as follows:

R denotes bitrate,

Q denotes quality metric (e.g. PSNR or SSIM or any other objective metric),

Q* denotes quality target that we must meet, $\Delta_Q$ denotes quality distance threshold, Q(R) denotes model of quality-rate relationship achieved for given sequence, and R* denotes final rate target computed by our method.

The method can start at block 910, where codec parameters for a first probe encoding are set, and the first probe encoding is run at block 920, resulting in rate and quality values ($R_1$, $Q_1$). As described above, the parameters for the first probe encoding can represent a "best educated guess" about how sequence should be encoded to reach a target quality value.

The functionality of blocks 930 and 940 are optional (as indicated by the dashed lines), and may be implemented for speed optimization. At block 930, the result of first probe encoding is evaluated. In cases where the resulting quality value $Q_1$ is within a certain threshold variance $\Delta_Q$ of the target quality value Q*, then a model may be defined at block 940 such that it crosses this the ($R_1$, $Q_1$) values of the first encoding, and the functionality at block 980 can be used to find the bit rate for the final encoding.

In cases when the step 930 is omitted or when the resulting quality value $Q_1$ of the first probe encoding is beyond the threshold variance $\Delta_Q$ of the target quality value Q*, a second probe encoding is performed first by setting codec parameters for the second probe encoding at block 950, then performing the second probe encoding at block 960. This time, the choice of codec parameters for the second probe encoding may be influenced by the result of first probe encoding, and the new target can be set in a way to get the result closer to the target quality value. The second probe encoding results in rate and quality values ($R_2$, $Q_2$).

After second probe encoding is done, both first and second points can be used at block 970 to define a quality-rate Q(R) model that fits to ($R_1$, $Q_1$) and ($R_2$, $Q_2$). This Q(R) model can then be used at block 980 to determine a bit rate R* for the final encoding of the source content.

Producing Optimal Encoding Ladder Given a Set of Constraints and an Optimization Criterion According to some embodiments, techniques for producing an optimal encoding ladder can be described as follows. Given the following:

source content Z, a set of profile constraints, such as:

limits for the number of encodings/renditions to be included in the profile:

$n \in N = [n_{min}, n_{max}]$, constraints on video resolutions that can be used in the profile:

$\mathcal{S} = \{S_\alpha, \alpha=1,2, \dots \}$, a set of resolutions that can be used, where each resolution is a record $S_\alpha = \{w_\alpha, h_\alpha, f_\alpha\}$ including frame width, height, and video framerate parameters, $\|S_\alpha\| = w_\alpha h_\alpha f_\alpha$ is the sampling rate (in pixels/second) of resolution $S_\alpha$, and $S_n = \{S_1, \dots S_n \in \mathcal{S}: \|S_1\| \le \dots \le \|S_n\|\}$, a set of n resolutions ordered according to sampling rate, constraints on bit rates that can be used in profile:

$\mathcal{R} = [R_{min}, R_{max}]$, the overall range of bitrates that can be used, and $R_n = \{R_1, \dots R_n \in \mathcal{R}: R_1 < \dots < R_n, R_1 \le R_{1,max}\}$, a set of n bitrates with order constraints, and also an upper limit $R_{1,max}$ imposed on the first rate (which is typically done to limit worst case buffering time), and possibly additional constraints, such as constraints on video codec, codec profiles and levels allowed for each resolution, GOP length, etc., and a figure of merit function:

F(n, R,S), assigning a certain score (or merit value) to an n-point ladder with rates R={$R_1, \dots, R_n$}, and resolutions $S_n$={$S_1, \dots, S_n$}.

Find:

the number of encodings $n^* \in N$, a set of bitrates: $R^* = \{R^*_1, \dots, R^*_{n^*}\} \in R_{n^*}$, and a set of resolutions $S^* = \{S^*_1, \dots, S^*_{n^*}\} \in S_{n^*}$, satisfying all above constraints and reaching the maximum value of the figure of merit function F n, R,S).

In other words, mathematically, the optimal profile generation problem can be defined as follows:

$$F(n^*, R^*, S^*) = \max_{\substack{n \in N \\ R=\{R_1,\dots,R_n\}\in R_n \\ S=\{S_1,\dots,S_n\}\in S_n}} F(n, R, S) \tag{16}$$

The choices of figure of merit function F(n, R, S) and additional parameters and constraints may create variations of the above problem. Several simple examples of such variations are listed below.

The minimization of total storage costs can be determined by:

$$R^*_1 + \dots + R^*_{n^*} = \max_{\substack{n \in N \\ R=\{R_1,\dots,R_n\}\in R_n \\ S=\{S_1,\dots,S_n\}\in S_n \\ \forall i: q_{S_i} \ge q_{min}}} R_1 + \dots + R_n. \tag{17}$$

In this case, the figure of merit function is the sum of bit rates of all encodings in the profile: F(n, R,S)=$R_1$+ . . . +$R_n$. To properly set this problem, the constraints on minimum encoding quality values for all renditions are also imposed. In formula (17) values $q_{s_i}$, i=1, . . . , n denote encoding quality values, and $q_{min}$ denotes a certain given minimum quality limit. As discussed earlier, such quality values can be measured in SSIM, PSNR, PQR, VMAF, or any other popular metrics.

The maximization of total achieved resolution can be determined by:

$$S^*_1 + \dots + S^*_{n^*} = \max_{\substack{n \in N \\ R=\{R_1,\dots,R_n\}\in R_n \\ S=\{S_1,\dots,S_n\}\in S_n \\ \forall i: q_{S_i} \ge q_{min}}} S_1 + \dots + S_n. \tag{18}$$

In this case, figure of merit function is the sum of resolutions of all encodings in the profile: F(n, R,S)= $S_1$+ . . . +$S_n$. To properly set this problem, the constraints on minimum encoding quality values for all renditions are also imposed.

The maximization of "pixels sent per bit" can be determined by:

$$\frac{S_1^* + \ldots + S_{n^*}^*}{R_1^* + \ldots + R_{n^*}^*} = \max_{\substack{n \in N \\ R = \{R_1, \ldots, R_n\} \in R_n \\ S = \{S_1, \ldots, S_n\} \in S_n \\ \forall i: q_{S_i} \geq q_{min}}} \frac{S_1 + \ldots + S_n}{R_1 + \ldots + R_n}. \qquad (19)$$

In this case, figure of merit function is ratio of the sums of resolutions over bitrates used by all encodings in the profile:

$$F(n, R, S) = \frac{S_1 + \ldots + S_n}{R_1 + \ldots + R_n}.$$

Figure 10:
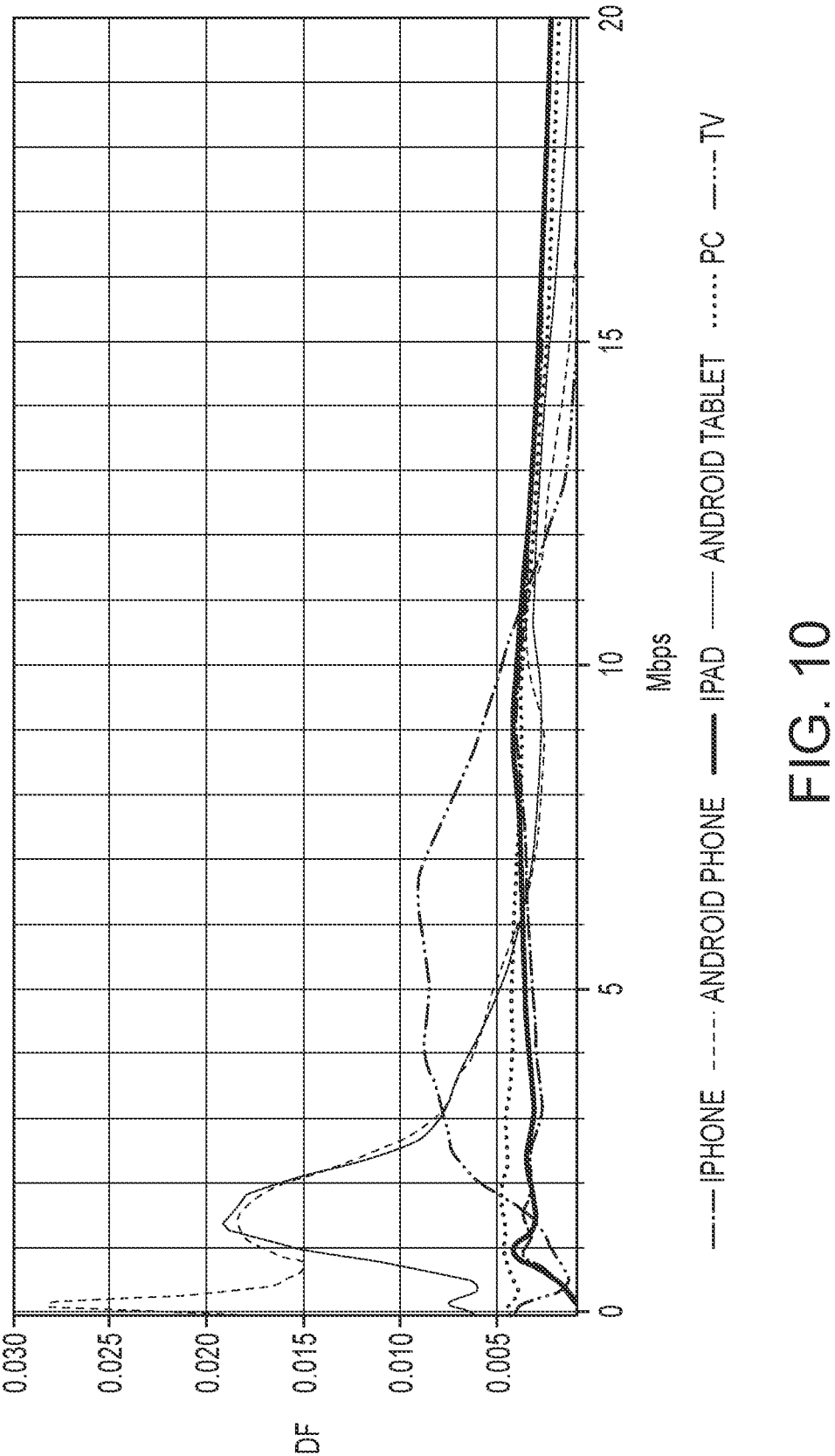
FIG. 10 is a diagram plotting bandwidth Probability Density Function (PDF) for various types of devices, according to an example.

Additional variations of the figure of merit function and the optimization problem (16) can posed when certain parameters of networks and usage across variety of networks or user devices are known. For example, the profile generator may use histograms of network bandwidth measured for several different user devices (such as iPhones, Android phones, iPads, Android Tablets, PCs, TVs, etc), as well as distribution of play time between those devices. An example of this is illustrated in FIG. 10, which plots PDF over bandwidth for various devices. In FIG. 10, the associated distribution of usage between the devices shown in the graph is 52.2% PCs, 17.3% Apple® iPhones®, 14.4% Android™ phones, 10.0%, Apple® iPads®, 3.54% Android™ tablets, and 2.56% TVs.

Assuming that:
 $\mathcal{D}$ denotes a set of such devices or categories of networks,
 $w_d$, $d \in \mathcal{D}$, $(\Sigma_d w_d = 1)$ denotes relative usage values (or weights) associated with devices or networks of each kind, and.
 $P_d$, $d \in \mathcal{D}$ $P_d = \{p_d(R), \int_{R_{min}}^{R_{max}} p_d(R) dR = 1\}$ denotes network bandwidth probability distributions defined for devices or networks of each kind, and where $p_{d,i} = \int_{R_{i-1}}^{R_i} p_d(R) dR$ indicates probability that i-th rendition will be used when delivered to d-th device/network,
the following additional variations of figure of merit function and optimization problem can be defined. The minimization of average network bandwidth usage can be determined by:

$$\sum_{d \in \mathcal{D}} w_d \sum_{i=1 \ldots n^*} p_{d,i} R_i^* = \max_{\substack{n \in N \\ R = \{R_1, \ldots, R_n\} \in R_n \\ S = \{S_1, \ldots, S_n\} \in S_n \\ \forall i: q_{S_i} \geq q_{min}}} \sum_{d \in \mathcal{D}} w_d \sum_{i=1 \ldots n} p_{d,i} R_i. \qquad (20)$$

In this case, the figure of merit function is the estimate of average bandwidth used when streaming clients pull profile encodings with estimated probabilities across all devices or networks: $F(n, R, S) = \sum_{d \in \mathcal{D}} w_d \Sigma_{i=1 \ldots n} p_{d,i} R_i$.

The maximization of average resolution can be determined by:

$$\sum_{d \in \mathcal{D}} w_d \sum_{i=1 \ldots n^*} p_{d,i} S_i^* = \max_{\substack{n \in N \\ R = \{R_1, \ldots, R_n\} \in R_n \\ S = \{S_1, \ldots, S_n\} \in S_n \\ \forall i: q_{S_i} \geq q_{min}}} \sum_{d \in \mathcal{D}} w_d \sum_{i=1 \ldots n} p_{d,i} S_i. \qquad (21)$$

In this case, the figure of merit function is the estimate of average resolution delivered when streaming clients pull profile encodings with estimated probabilities across all devices or networks: $F(n, R, S) = \sum_{d \in \mathcal{D}} w_d \Sigma_{i=1 \ldots n} p_{d,i} S_i$.

Additional parameters and constraints additionally or alternatively may be introduced in practical settings. These can include, for example, accuracy constraints. For instance, all rate points $R_1, \ldots, R_n$ can be specified/enumerated with certain accuracy limits. For example, they can all be rounded to nearest Kbps, or nearest factor of 10 Kbps. Introducing such rounding can be a matter of practical convenience as well as speed control for optimization algorithm. The finer precision is needed the more time may generally be needed to compute it.

In some embodiments, granularity constraints may be introduced. In practice, it is often desirable to limit magnitude of changes ("steps") from one rate point to another. Mathematically, this can be done, by introducing the following limit:

$$\gamma_{min} \leq \frac{R_{i+1}}{R_i} - 1 \leq \gamma_{max}, i = 1, \ldots, n-1, \qquad (22)$$

where $\gamma_{min}$, $\gamma_{max}$ are granularity constants (e.g. 25% and 50%). Using such granularity constraints, the space of allowed rate points narrows down to:

$$R_n = \left\{ R_1, \ldots R_n \in \mathcal{R}: R_1 \leq R_{1,max}, \gamma_{min} \leq \frac{R_{i+1}}{R_i} - 1 \leq \gamma_{max}, \right. \qquad (23)$$
$$\left. i = 1, \ldots, n-1 \right\}.$$

Some embodiments may involve quality-related parameters, targets, and constraints. Understanding of quality of video reproduction is a complex topic. It has multiple dimensions, layers, and there are different degrees of sophistication that one can adopt in trying to model it. In some embodiments, two categories/levels of quality assessment techniques:
 a. A first category comprises codec noise level metrics. Some examples include PSNR, SSIM, Feature Similarity Index Metric (FSIM), and the like. These metrics can be measured for each resolution and may be limited to measuring only codec noise.
 b. A second category comprises calibrated video quality metrics. These metrics can take into account characteristics of a display device, viewing environment, and/or other factors in addition to codec-induced noise. Some examples of calibrated metrics include Visual Difference Predictor (VDP), Sarnoff/Tectronix Picture Quality Rating (PQR), SSIMwave SQM, and the like.
 In an example, a codec-noise-level metric can be SSIM. SSIM quality constraints introduced for all resolutions and renditions can then be described as follows:

$$q_{min} \leq q_i \leq q_{max}, i = 1, \ldots, n, \qquad (24)$$

where $q_{min}$, $q_{max}$ denote the lower and upper SSIM bounds, and $q_i$, $i=1, \ldots$ , n denote SSIM values achieved for all renditions.

For measuring video quality adapted to a specific reproduction setup, a perceptually-weighted SSIM can be used, computed illustrated in FIG. 10.

Figure 11:
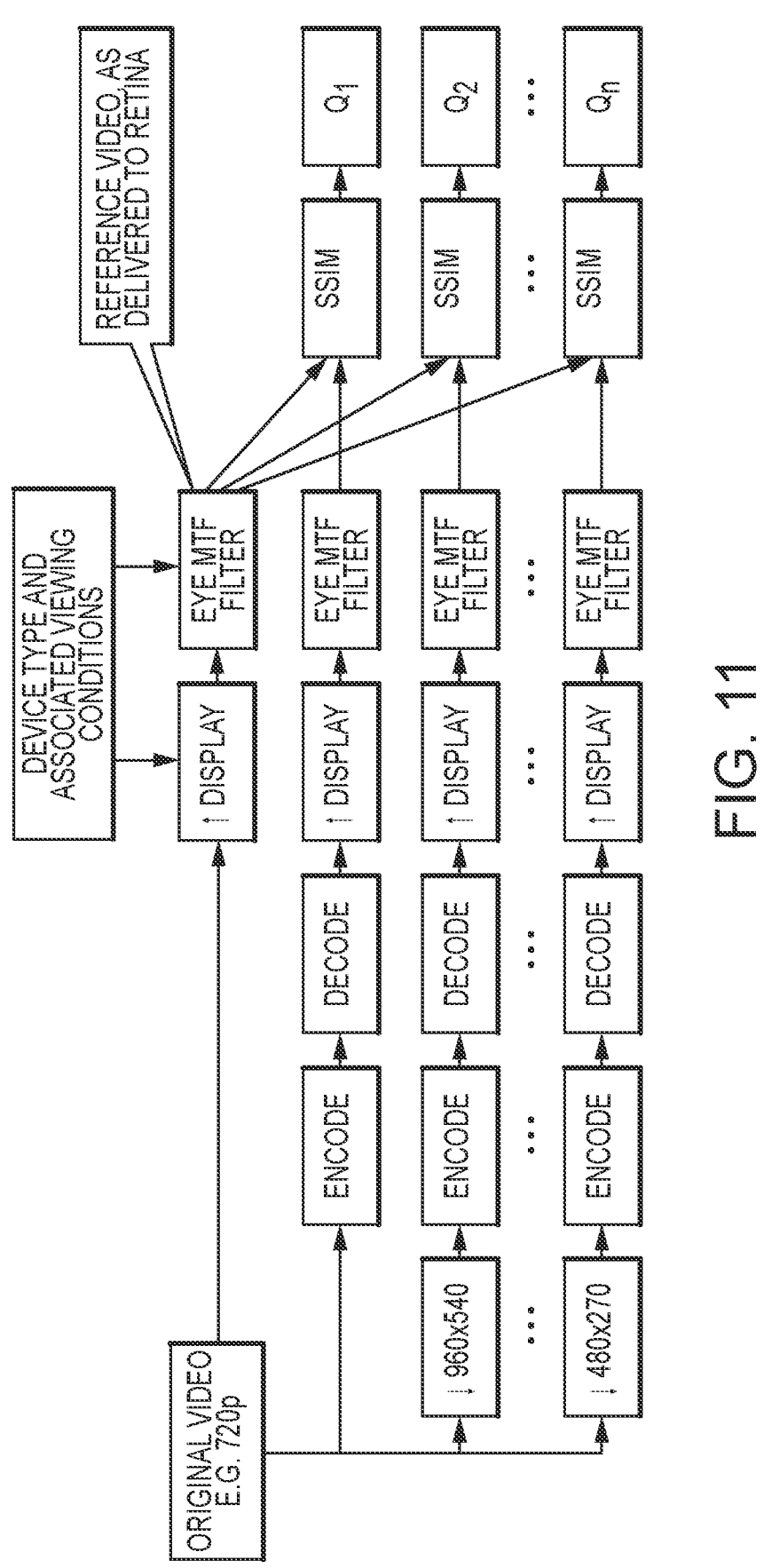
FIG. 11 is a diagram illustrating how a perceptually-weighted SSIM can be computed, according to an embodiment.

FIG. 11 is a diagram illustrating how a perceptually-weighted SSIM can be computed, according to an embodiment. As shown, to account for different resolutions, all videos can be scaled to the resolution of a reproduction display. Additional filtering then can be applied to simulate optical transformation of video in the path from the display to the eye's retina. This transformation is known as "optical MTF of human eye." Parameters of eye MTF filter (viewing distance, overall luminance of view field, etc.) can be set to reflect typical viewing conditions when watching videos on devices of different types (TVs, PCs, tablets, etc.).

In other words, after computing perceptually-weighted SSIMs, the following set of values is determined:

$$Q_{d,i}, d \in \mathcal{D}, i = 1, \dots, n, \qquad (25)$$

where $\mathcal{D}$ is a set of target devices (e.g. TVs, PCs, tablets, smartphones, etc.) and the associated viewing conditions, and i is the index of each encoding (same index is also used to retrieve encoding resolution $S_i$ and rate $R_i$).

According to some embodiments, values typical viewing conditions associated with each device type may be as shown in the following table:

TABLE 4

Example Viewing Condition Values

| Device/Content | Viewing Distance | Display Size | Brightness | Ambient Light | Background Light |
|---|---|---|---|---|---|
| TV, living room | 3-6H, med = 4.H | 32-80", med = 46" | 400 nits | 50-200 lux | Reflective 10-30% |
| PC/laptop | 12-30", med = 24" | 13-36", med = 20" | 120 nits | 100-500 lux | Varies |
| Tablet, short content | 12-24", med = 24" | 7-12", med = 9" | 200 nits | 50-500 lux | Varies |
| Table, long content | 18-26", med = 24" | 7-12", med = 9" | 200 nits | 50-500 lux | Varies |
| Mobile phone | 7.5-24", med = 14" | 4-6", med = 5" | 200 nits | 10-10000 lux | Varies |

The values H in this table denote viewing distance as measured in units of display heights.

The perceptual (eye optical MTF) filter was developed to match these conditions, based on MTF model:

$$M_{opt}(u) = e^{-2\pi^2\sigma^2 u^2} \quad \sigma = \sqrt{\sigma_0^2 \div (C_{ab}d)^2} \qquad (26)$$

$$\sigma_0 = 0.5 \text{ arc min}$$

$$C_{ab} = 0.08 \text{ arc min/mm}$$

where d is the pupil diameter, computed based on anticipated average luminance L in the field of view: d=5–3 tanh(0.4 logL). This model is described in "J.G. Barten, Contrast Sensitivity of the Human Eye and Its Effects on Image Quality," SPIE Press, 1999, (http://spie.org/Publications/Book/353254) which is incorporated herein by reference.

Given a set of perceptually weighted SSIM values $Q_{d,i}$, as well as usage values $w_d$ and probability estimates of accessing each rendition $p_{d,i}$, the problem of finding a profile delivering the best possible overall quality can be defined as follows.

$$\sum_{d \in \mathcal{D}} w_d \sum_{i=1\dots n^*} p_{d,i} Q^*_{d,i} = \max_{\substack{n \in N \\ R=\{R_1,\dots,R_n\} \in R_n \\ S=\{S_1,\dots,S_n\} \in S_n}} \sum_{d \in \mathcal{D}} w_d \sum_{i=1\dots n} p_{d,i} Q_{d,i}. \qquad (27)$$

Figure 12:
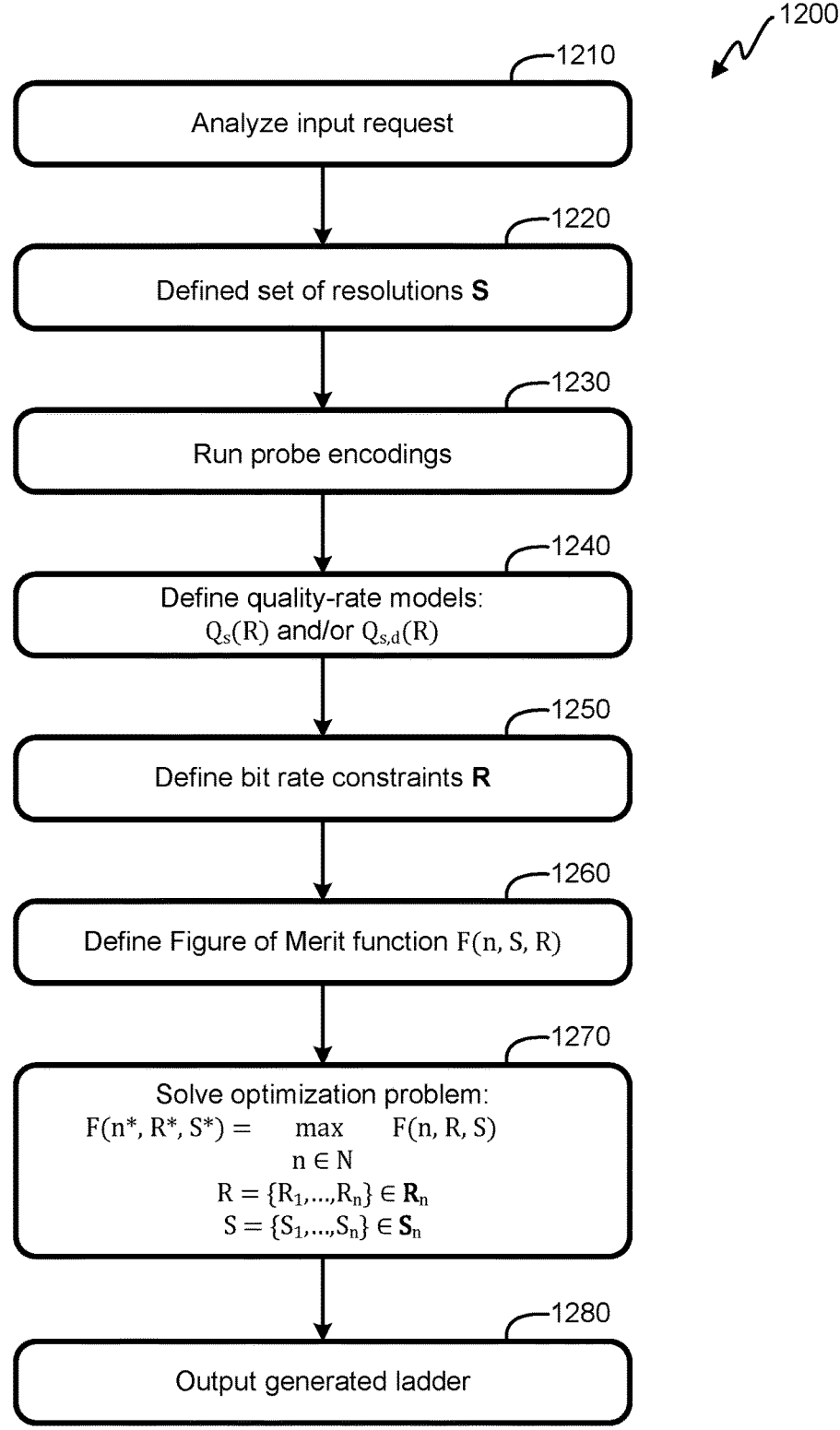
FIG. 12 is a flow diagram illustrating a method of generating an optimal encoding ladder using the techniques described herein above, according to an embodiment.

In this case, the best set of quality values $Q^*_{d,i} = Q^*_{d,i}(R^*_i, S^*_i)$ found reflects best choices of rates $R^*_i$ and resolutions $S^*_i$ made for all encodings in the profile. The figure of merit function is the average quality delivered when streaming clients pull profile encodings with estimated probabilities across all devices or networks: $F(n, R, S) = \sum_{d \in \mathcal{D}} w_d \sum_{i=1\dots n} p_{d,i} Q_{d,i}$ FIG. 12 is a flow diagram 1200 illustrating a method of generating an optimal encoding ladder using the techniques described herein above, according to an embodiment. It will be understood that the steps provided in the flow diagram 1200 are provided as an example. Alternative embodiments may add, omit, combine, separate, and otherwise alter the functions as shown. The functions of one or more of the blocks illustrated in FIG. 12 may be performed, for example, by software and/or hardware means of a computer system, such as the computer system illustrated in FIG. 15, described in more detail below.

Here, the method can begin with block 1210, where an input request is analyzed. Such request, as described earlier, may include ULR to media to be transcoded and certain parameters/constraints that should be imposed on the generated profile. The request can be received at a device and/or application executing a transcoding operation (such as profile generation operation 230 illustrated in FIG. 2).

At block 1220, a set of allowed video resolutions S is defined. Such resolutions may be defined based, in part on resolution, aspect ratio, and framerate of the input media. Certain constraints on resolutions, or lists of allowed resolutions can also be provided as part of input request.

Based on the set of resolutions, probe encodings can be performed at block 1230 using the techniques described herein above (e.g., the method shown in FIG. 900, using 1-2 probe encodings per resolution). Quality-rate models can then be defined at block 1240, based on the probe encodings. Such models should generally be defined for all allowed resolutions that can be used to generate the profile.

Rate constraints are R defined at block 1250. Similar to the set of resolutions, some rate constraints may be provided by the input request analyzed at block 1210. As described above, these initial rate constraints may be refined according to various algorithms. For instance, if input request also includes constraints on quality levels, then by using quality-rate models defined in block 1240, they can be mapped to corresponding constraints in the rate domain. Additional rate constraints may be imposed based on codec-specific limits related to codec profile and levels that are being used. A superset of constraints obtained in such a manner for all allowed resolutions is then be used as input to optimization process 1270.

At block 1260 all remaining parameters needed for computing the Figure of Merit function are defined. Such parameters may include network and usage statistics, importance weights to be assigned to different categories of devices, etc.

At block 1270, a numerical optimization process occurs wherein allowed spaces for rates and resolutions are scanned, and the combination achieving the maximum of the Figure of Merit is picked.

Finally, at block 1280, the generated encoding ladder (encoding profile) is stored or sent to the output.

Figure 13:
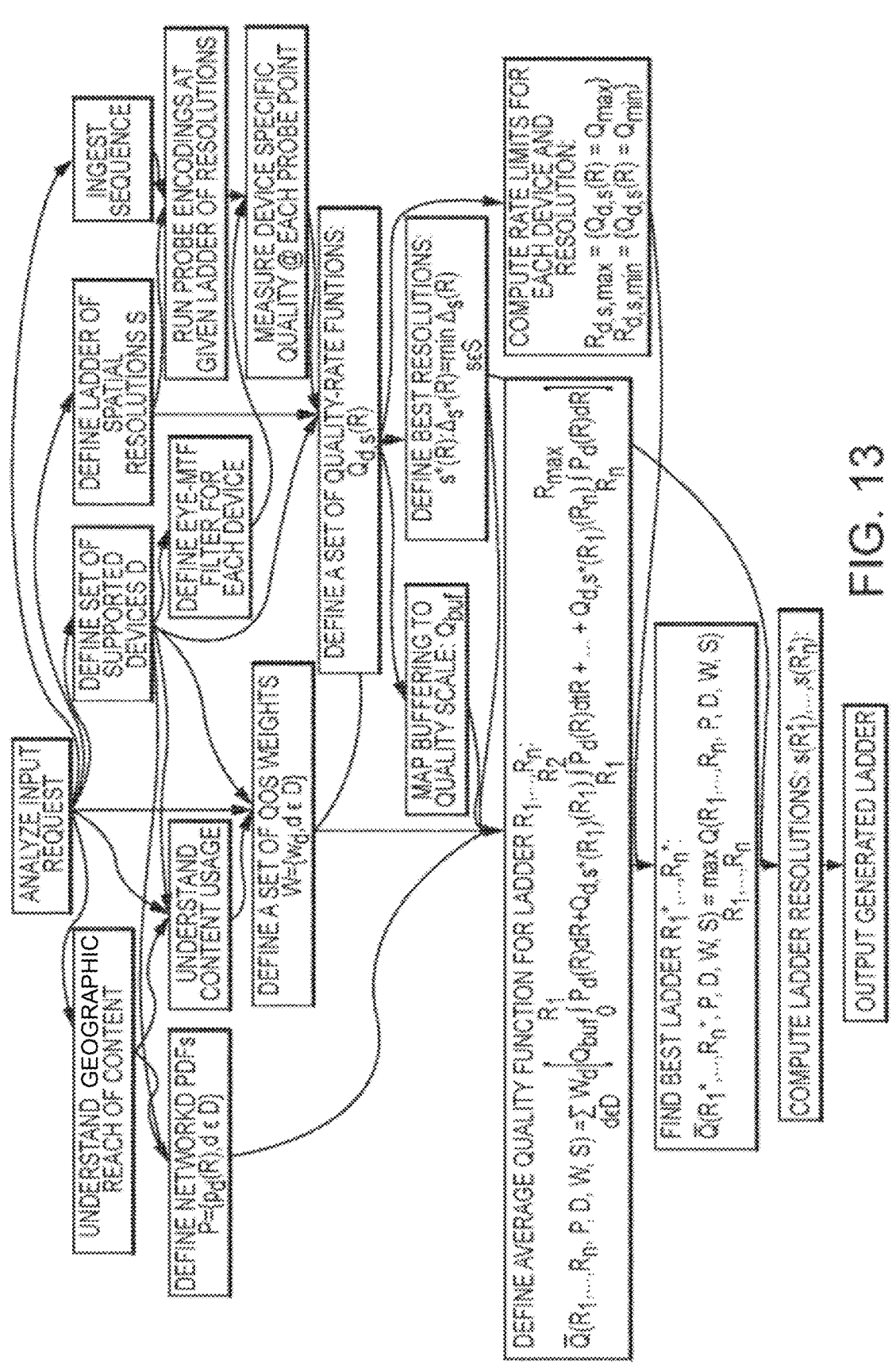
FIG. 13 is a flow chart of a process in which encoding ladder generation is based on additional information, such as network and usage statistics, according to an embodiment.

Based on the nature of Figure of Merit function, and availability of input parameters, some additional steps may be introduced. FIG. 13, for example, illustrates a flow chart of a much more complicated process in which encoding ladder generation is based on additional information, such as network and usage statistics, according to an embodiment. In the process shown in FIG. 13, network information is used as well as geographic reach of the content, importance of different delivery devices (Quality of Service (QoS) weights), and the like. This example process formulates the Figure of Merit as the overall average quality achieved by the system.

Performance gains using the techniques provided herein can be significant, and may vary depending on content and other factors. According to experimental results, produced using over 200 hours of media content of various kind, multi-rendition profiles (a full encoding ladder) for certain 720p and 1080p sequences were created using the techniques herein (e.g., creating "dynamic profiles") and resulted in a reduction of a storage/bandwidth footprint by an average of 53% and a reduction in the rendition count required by an average of 38% compared with traditional static profiles. Experimental results for single-rendition encoding at resolutions of 1080p, 720p, 768×432, and 768×576 for various files had similar benefits: single-rendition encoding using dynamic profiles generated by the techniques described herein reduced the required storage/bandwidth footprint by an average of 36% compared with traditional static profiles. Finally, experimental results for single-rendition encoding at low resolution (640×360) for various files resulted in a 44% reduction in required storage/bandwidth footprint compared with traditional static profiles.

Figure 14:
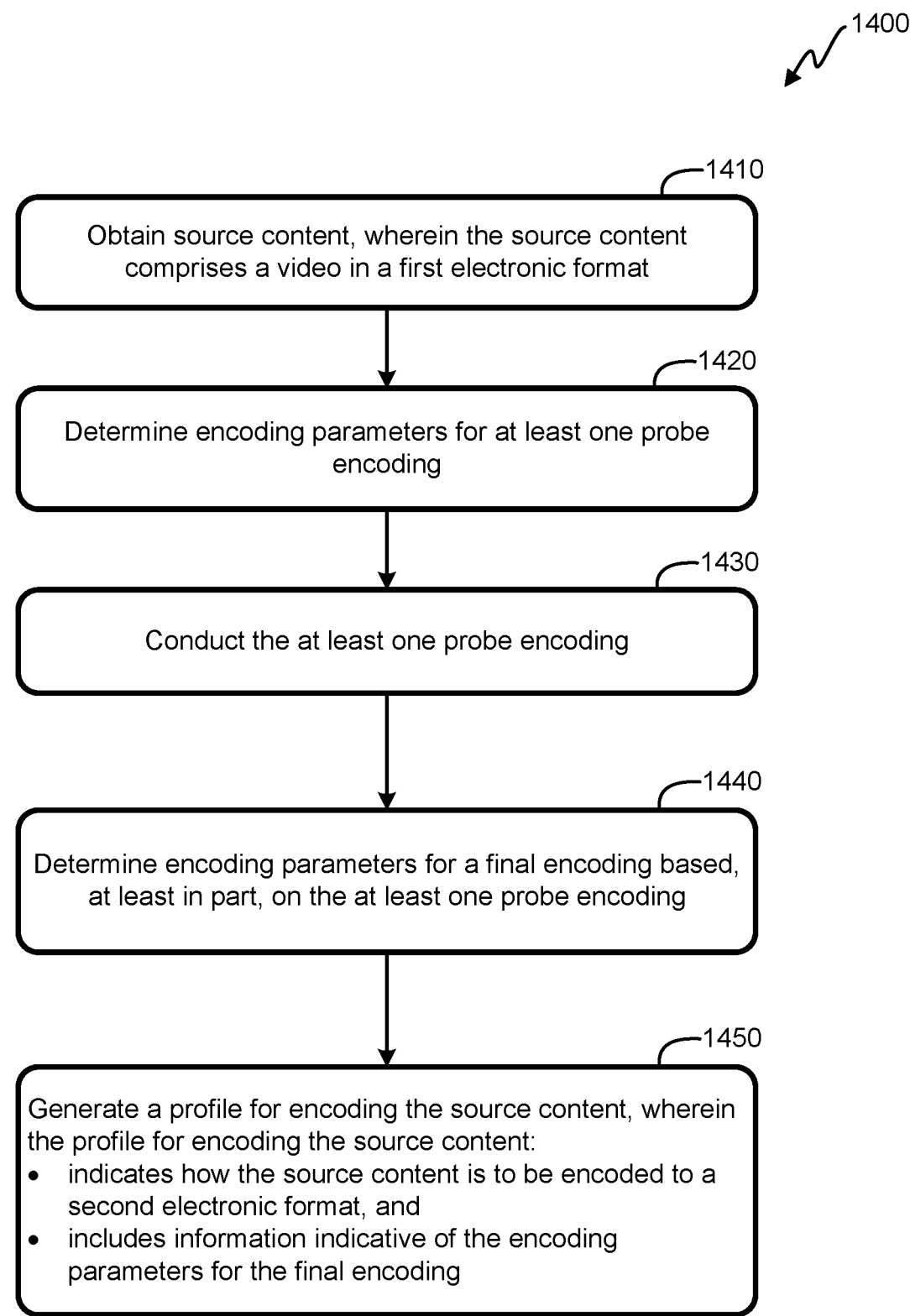
FIG. 14 is a flow diagram illustrating a method of optimization of encoding source content, according to an embodiment.

FIG. 14 is a flow diagram illustrating a method 1400 of method of optimization in encoding source content, according to an embodiment, which can use one or more of the optimization techniques described above. It will be understood that the steps provided in FIG. 14 are provided as an example. Alternative embodiments may add, omit, combine, separate, and otherwise alter the functions as shown. The functions of one or more of the blocks illustrated in FIG. 14 may be performed, for example, by software and/or hardware means of a computer system, such as the computer system illustrated in FIG. 15 described in more detail below.

At block 1410, the method 1400 can begin by obtaining source content. Here the source content comprises a video in a first electronic format. As previously mentioned, the source content may be provided in any of a variety of formats, including a digital master, mezzanine file, input stream, separated video elementary stream, or the like.

At block 1420, encoding parameters are determined for at least one probe encoding. As discussed in the techniques provided above, in some embodiments, encoding parameters set to conduct a probe encoding may use quality limits. In some embodiments, determining a bit rate or CRF value for the at least one probe encoding may further be based on a target video resolution. Such parameters may include number of encodings, resolutions, bitrates, codec-specific constraints, etc.

At block 1430, at least one probe encoding is conducted. In some embodiments, a first probe encoding may analyze the entire content. One or more subsequent probe encodings can be done by encoding a portion of the source content using the bit rate for the first probe encoding. The amount of the source content encoded can vary, depending on desired functionality. A relatively large amount of content may be encoded to provide a more accurate representation of the content type, whereas a relatively smaller amount of content may be encoded to help ensure the method 1400 is executed more quickly.

In some embodiments, a rate and quality value of a probe encoding may be determined. The determination of the quality value may vary, depending on the quality value used. As discussed above, a quality value may comprise a value of SSIM, MOS, PQR, VMAF and the like.

In some embodiments, it may be determined that a difference between the quality value of a first probe encoding and a target quality value exceeds a certain threshold value. As discussed at block 930 of FIG. 9 and illustrated in FIG. 3, a certain threshold value may reflect a minimum acceptable variation from the target quality value.

In some embodiments, encoding parameters for a second probe encoding is may be determined based, at least in part, on the bit rate or quality of the first probe encoding, and the second probe encoding can be conducted using the encoding parameters for the second probe encoding. As previously discussed (and described in relation to FIGS. 7 and 8), the results of the first probe encoding can inform the selection of encoding parameters for the second probe encoding.

In some embodiments, the rate and quality value of the second probe encoding may be determined. Moreover, the determination of the quality value can vary, depending on desired functionality.

At block 1440 encoding parameters of final encoding (or multiple final encodings) are determined. Such parameters may include number of encodings, resolutions, bitrates, codec-specific constraints, etc. In some embodiments a bit rate is determined for a final encoding based, at least in part, on the at least one probe encoding. In some embodiments, such as the embodiments described above that include first and second probe encodings, the bit rate for final encoding may be based on the quality value of the first probe encoding and the quality value of the second probe encoding. As previously mentioned, the determination of a bit rate for the final encoding (e.g., to include in an encoding profile) may comprise fitting a quality model to the quality value of the first probe encoding and the quality value of the second probe encoding, as described in relation to FIG. 8. As previously described, parameters of the model may be based at least in part on the quality value of the first probe encoding. As such, determining a gain and shape of the quality model may be based on the quality value of the first probe encoding. The video resolution and/or the bit rate for the final encoding may be determined by solving optimization problem, utilizing Figure of Merit function, as discussed above.

At block 1450, a profile for encoding the source content is generated, wherein the profile for encoding the source content indicates how the source content is to be encoded to a second electronic format, and includes information indicative of the encoding parameters for the final encoding. As previously discussed, the profile may include an encoding ladder in which the final encoding comprises one of a plurality of encodings. In such cases, a Figure of Merit function may be used to determine encoding parameters, such as the number of encodings and video resolutions and bit rates to be used for each encoding. (Other encoding parameters are shown in Table 1.) Some embodiments may further include performing the encoding of the source content to the second electronic format in accordance with the profile for encoding the source content, and storing the source content encoded to the second electronic format.

Figure 15:
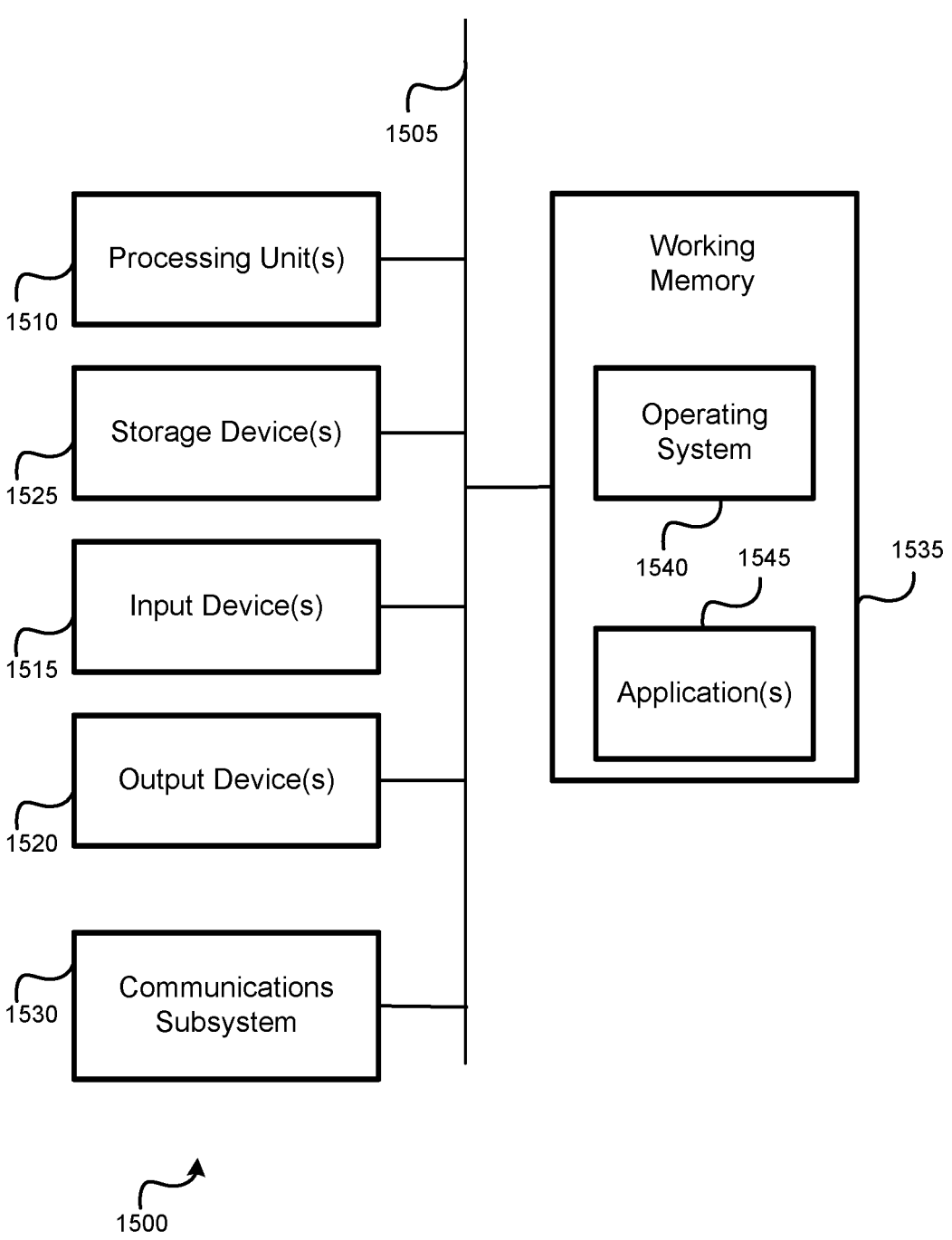
FIG. 15 is a block diagram of an embodiment of a computer system.

FIG. 15 illustrates an embodiment of a computer system 1500, which may be used, in whole or in part, to perform one or more of the functions of the methods described herein, including the methods shown in FIGS. 9, 13, and 14. The computer system may be incorporated into one or more of the entities of a media servicing system (e.g., media servicing system 100 of FIG. 1), including a transcoding service 110. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processing unit(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices, as described herein.

The computer system 1500 might also include a communications subsystem 1530, which may comprise wireless communication technologies managed and controlled by a wireless communication interface, as well as wired technologies (such as Ethernet, coaxial communications, universal serial bus (USB), and the like). As such, the communications subsystem 1530 may comprise a modem, a network card (wireless or wired), an infrared communication device, a wireless communication device, and/or a chipset, and/or the like, which may enable the computer system 1500 to communicate on one or more communication networks with any device on the respective network, including other computer systems and/or any other electronic devices (including operations and/or applications executed thereon) described herein. Hence, the communications subsystem 1530 may be used to receive and send data as described in the embodiments herein.

In many embodiments, the computer system 1500 will further comprise a working memory 1535, which may comprise a RAM or ROM device, as described above. Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/ code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

We claim:

1. A method for dynamically encoding content for adaptive bit rate (ABR) streaming, comprising:

determining a geographic reach for an intended distribution of the content and network capabilities for the intended distribution of the content, wherein determining the geographic reach and the network capabilities comprises:

assessing network bandwidth and reliability in a plurality of target regions; and receiving a request for the content;

generating encoding profiles for the content based at least in part on the geographic reach for the intended distribution of the content and the network capabilities for the intended distribution of the content, wherein the generating the encoding profiles comprises:

generating a first subset of high bitrate encoding profiles for one or more target regions of the plurality of target regions with high bandwidth;

generating a second subset of low bitrate encoding profiles for one or more target regions of the plurality of target regions with low bandwidth; and based, at least in part, on determining that the request for the content corresponds to the one or more target regions of the plurality of target regions with high bandwidth, encoding the content with the first subset of high bitrate encoding profiles.

2. The method of claim 1, further comprising:

determining each of a complexity of the content, the geographic reach for the intended distribution of the content, the network capabilities for the intended distribution of the content, content usage statistics for an intended lifespan of the content, and a type of a device used by a target audience of the content.

3. The method of claim 2, wherein determining the complexity of the content comprises:
identifying high-motion and low-motion scenes within the content; and
adjusting encoding bit rates accordingly, with higher bit rates for high-motion scenes and lower bit rates for low-motion scenes.

4. The method of claim 2, wherein the determining the content usage statistics comprises:
analyzing viewing patterns and popularity of a plurality types of the content; and
adjusting the encoding profiles to prioritize high-quality encoding parameters for frequently viewed content.

5. The method of claim 2, wherein the determining the intended lifespan of the content comprises:
categorizing the content by the intended lifespan as at least one of live content, short-living content, or long-living content; and
selecting encoding parameters that balance quality and storage requirements based on the intended lifespan of the content.

6. The method of claim 1, further comprising:
prioritizing encoding parameters based on device types;
identifying one or more primary types of devices used by a target audience; and
generating encoding profiles that prioritize high-quality encoding parameters for one or more most commonly used devices.

7. The method of claim 1, comprising:
parsing the request to extract a location of source content and one or more target encoding parameters.

8. The method of claim 1, wherein the generating the encoding profiles further comprises:
generating the encoding profiles with a plurality of bit rates, resolutions, and framerates, based at least in part on the geographic reach for the intended distribution of the content and the network capabilities for the intended distribution of the content.

9. The method of claim 1, comprising:
allocating server resources to control encoding based on the generated encoding profiles.

10. A system for dynamically encoding content for adaptive bit rate (ABR) streaming, comprising:
a processor configured to determine a geographic reach for an intended distribution of the content and network capabilities for the intended distribution of the content, wherein the processor is configured to determine the geographic reach and the network capabilities by:
assessing network bandwidth and reliability in a plurality of target regions; and
a receiver configured to receive a request for the content;
an encoder configured to:
generate encoding profiles for the content based at least in part on the geographic reach for the intended distribution of the content and the network capabilities for the intended distribution of the content, wherein the encoder is configured to generate the encoding profiles by:

generating a first subset of high bitrate encoding profiles for one or more target regions of the plurality of target regions with high bandwidth;
generating a second subset of low bitrate encoding profiles for one or more target regions of the plurality of target regions with low bandwidth; and
based, at least in part, on determining that the request for the content corresponds to the one or more target regions of the plurality of target regions with high bandwidth, encode the content with the first subset of high bitrate encoding profiles.

11. The system of claim 10, wherein the processor is further configured to determine each of a complexity of the content, the geographic reach for the intended distribution of the content, the network capabilities for the intended distribution of the content, content usage statistics for an intended lifespan of the content, and a type of a device used by a target audience of the content.

12. The system of claim 11, wherein the processor is further configured to determine the complexity of the content by identifying high-motion and low-motion scenes within the content, and adjusting encoding bit rates accordingly, with higher bit rates for high-motion scenes and lower bit rates for low-motion scenes.

13. The system of claim 11, wherein the processor is further configured to determine the content usage statistics by analyzing viewing patterns and popularity of a plurality of types of the content, and adjusting the encoding profiles to prioritize high-quality encoding parameters for frequently viewed content.

14. The system of claim 11, wherein the processor is further configured to determine the intended lifespan of the content by categorizing the content by the intended lifespan as at least one of live content, short-living content, or long-living content, and selecting encoding parameters that balance quality and storage requirements based on the intended lifespan of the content.

15. The system of claim 10, further comprising:
a prioritization module configured to prioritize encoding parameters based on device types;
the processor further configured to identify one or more primary types of devices used by a target audience; and
the encoder further configured to generate encoding profiles that prioritize high-quality encoding parameters for one or more most commonly used devices.

16. The system of claim 10, further comprising:
a parser configured to parse the request to extract a location of source content and one or more target encoding parameters.

17. The system of claim 10, wherein the encoder is further configured to generate the encoding profiles with a plurality of bit rates, resolutions, and framerates based at least in part on the geographic reach for the intended distribution of the content and the network capabilities for the intended distribution of the content.

18. The system of claim 10, further comprising:
a resource allocator configured to allocate server resources to control encoding based on the generated encoding profiles.

* * * * *